(12) United States Patent
Shimizu

(10) Patent No.: US 10,733,875 B2
(45) Date of Patent: Aug. 4, 2020

(54) DETECTION DEVICE, INFORMATION INPUT DEVICE, AND WATCHING SYSTEM

(71) Applicant: CITIZEN WATCH CO., LTD., Tokyo (JP)

(72) Inventor: Hideki Shimizu, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/310,427

(22) PCT Filed: Jun. 16, 2017

(86) PCT No.: PCT/JP2017/022415
§ 371 (c)(1),
(2) Date: Dec. 15, 2018

(87) PCT Pub. No.: WO2017/217548
PCT Pub. Date: Dec. 21, 2017

(65) Prior Publication Data
US 2019/0333367 A1 Oct. 31, 2019

(30) Foreign Application Priority Data

Jun. 17, 2016 (JP) ................................. 2016-120414
Jul. 1, 2016 (JP) ................................. 2016-131506

(51) Int. Cl.
G08C 23/02 (2006.01)
G08B 21/18 (2006.01)
G06F 3/01 (2006.01)

(52) U.S. Cl.
CPC .............. *G08C 23/02* (2013.01); *G06F 3/011* (2013.01); *G06F 3/017* (2013.01); *G08B 21/18* (2013.01)

(58) Field of Classification Search
None
See application file for complete search history.

(56) References Cited

U.S. PATENT DOCUMENTS 6,491,647 B1* 12/2002 Bridger .................. A61B 5/021
   128/900
7,689,283 B1* 3/2010 Schecter .................. A61B 7/00
   607/18

(Continued)

FOREIGN PATENT DOCUMENTS

JP 2001-318691 A 11/2001
JP 2006-319907 A 11/2006

(Continued)

OTHER PUBLICATIONS

WIPO, International Search Report for PCT/JP2017/022415, dated Jul. 18, 2017.

(Continued)

*Primary Examiner* — Adolf Dsouza

(57) ABSTRACT

Provided is a detection device for detecting inaudible sound waves generated by a user's bodily motion to identify the user's motion. The detection device includes: a detector detecting inaudible sound waves generated by a bodily motion; an acquiring unit acquiring burst information on at least one of the duration and frequency of a burst during which a cluster of pulses appears in a waveform of the inaudible sound waves detected by the detector; a memory storing reference information on reference values compared with the burst information, the reference values differing from each other depending on the types of bodily motions generating inaudible sound waves; and a determining unit comparing the burst information with the reference information to determine which of bodily motions has caused the inaudible sound waves detected by the detector.

10 Claims, 22 Drawing Sheets

(56) References Cited

U.S. PATENT DOCUMENTS

| | | | |
|---|---|---|---|
| 2002/0171551 A1 | 11/2002 | Eshelman et al. | |
| 2006/0262001 A1 | 11/2006 | Ouchi et al. | |
| 2012/0032905 A1 | 2/2012 | Koshiyama et al. | |
| 2015/0262612 A1* | 9/2015 | Kawahara | G06K 9/00342 386/355 |
| 2017/0347951 A1* | 12/2017 | Gollakota | A61B 5/0816 |

FOREIGN PATENT DOCUMENTS

| | | |
|---|---|---|
| JP | 2011-237865 A | 11/2011 |
| JP | 2012-038164 A | 2/2012 |
| JP | 2012-110559 A | 6/2012 |
| JP | 2014-055783 A | 3/2014 |
| JP | 2014-067082 A | 4/2014 |
| JP | 2014-085963 A | 5/2014 |

OTHER PUBLICATIONS

WIPO, Written Opinion for PCT/JP2017/022415, dated Jul. 18, 2017.
European Patent Office, Extended European Search Report for European Patent Application No. 17813441.7, dated Dec. 19, 2019.
Yinlin Li, Christoph Groenegress, Jochen Denzinger, "An acoustic interface for triggering actions in virtual environments", Proceedings of SPIE, Fourth International Conference on Virtual Reality and Its Applications in Industry, Mar. 19, 2004, XP040185697, DOI: 10.1117/12.561152 (Cited in Extended European Search Report for European Patent Application No. 17813441.7).

* cited by examiner

FIG. 4

| FRICTIONAL MOTIONS | P3 | | Pt | | Ps |
|---|---|---|---|---|---|
| | BURST WIDTHS (ms) | AVERAGE FREQUENCIES (kHz) | BURST WIDTHS (ms) | AVERAGE FREQUENCIES (kHz) | |
| FINGER SNAPPING | 26 | 3.1 | 16~48 | 3.5~4 | Ps1 |
| NAIL FLICKING | 10 | 2.5 | 5~12 | 2~3 | Ps2 |
| PALM RUBBING | 800 | 1.3 | 500~ | 1~1.5 | Ps3 |
| MOUTH OPENING/CLOSING | 1.5 | 3.8 | 1~2 | 3.5~4 | Ps4 |
| CLUCKING | 28 | 2.5 | 16~32 | 2~3 | Ps5 |
| SNIFFLING | 480 | 3.8 | 400~500 | 3.5~4 | Ps6 |

FIG. 6
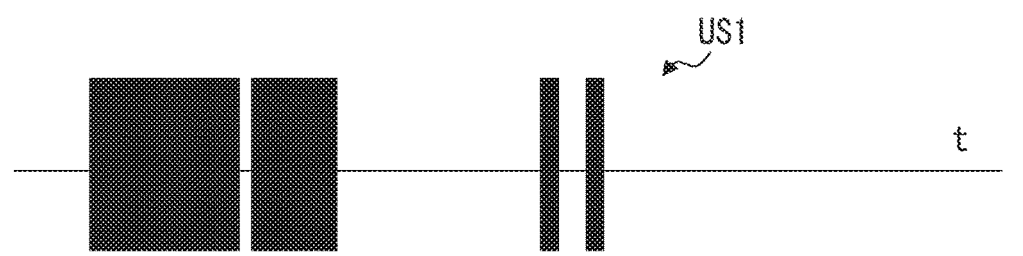
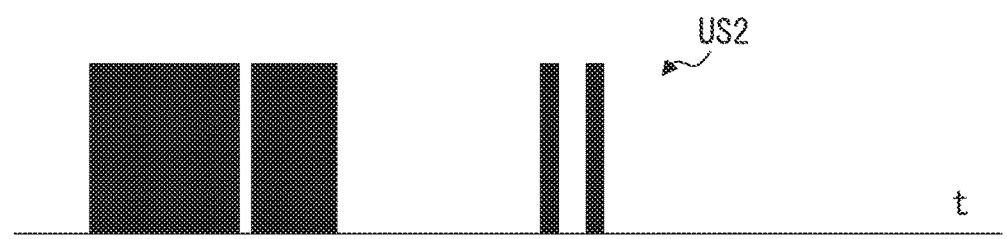
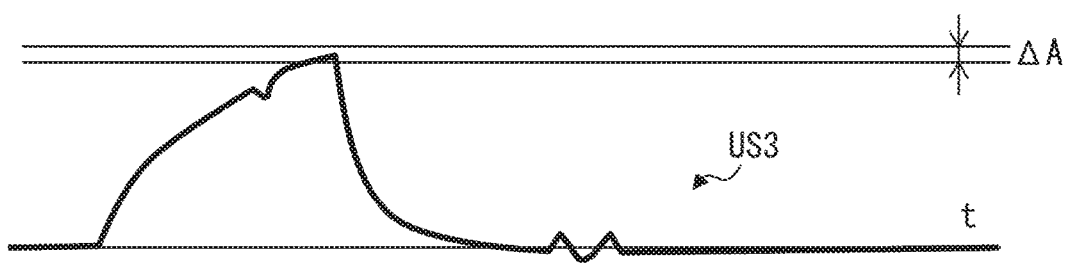

FIG. 8
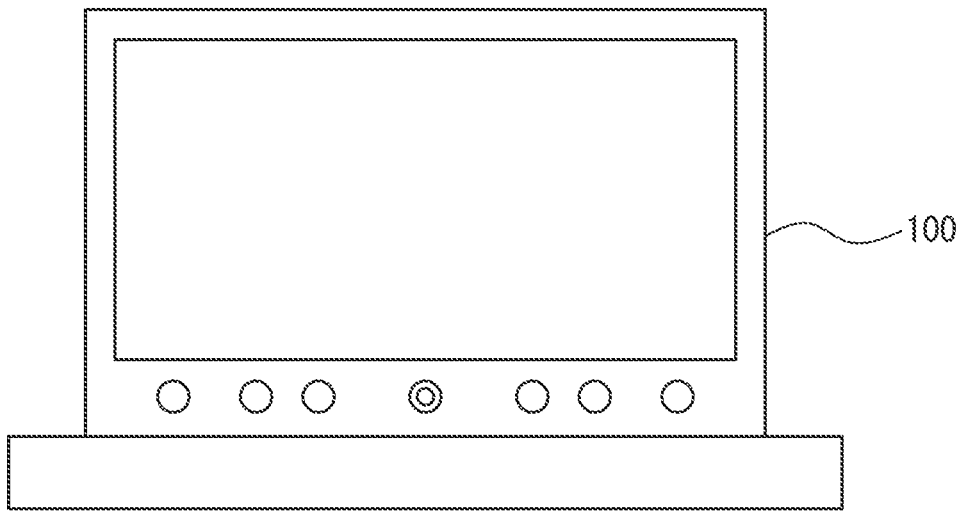
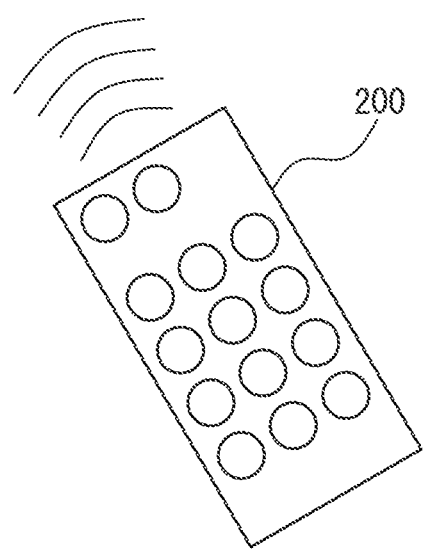

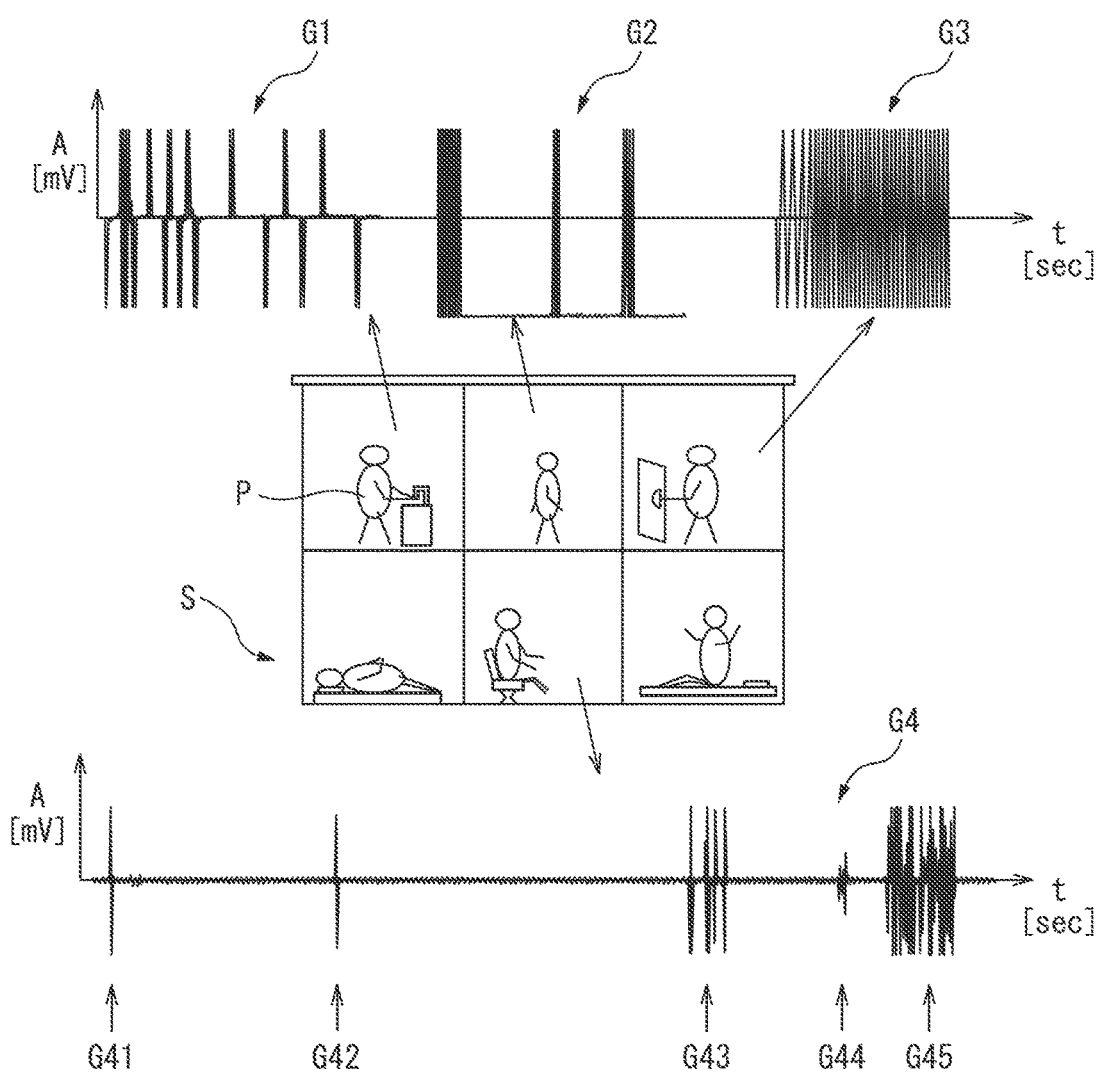

FIG. 19

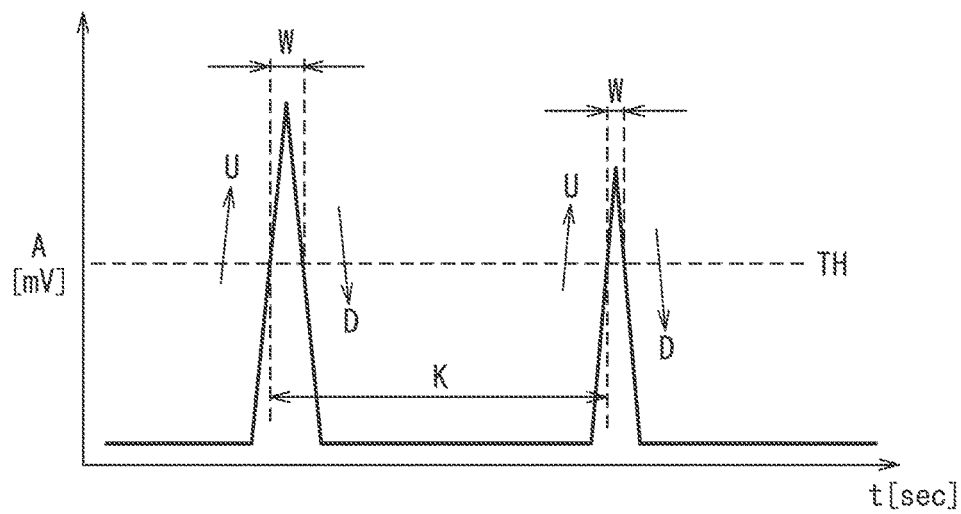

FIG. 20

| ITEMS OF DETECTION<br>DETERMINATION | DOOR OPENING/CLOSING | PRESENCE |
|---|---|---|
| BEING PRESENT | — | DETECTED WITHIN 24 HOURS |
| GOING OUT FOR TRAVELLING | DETECTED WITHIN 24 HOURS OF PREVIOUS DETECTION OF PRESENCE | NOT DETECTED MORE THAN 24 HOURS SINCE PREVIOUS DOOR OPENING/CLOSING |
| ANOMALY | NOT DETECTED MORE THAN 24 HOURS SINCE PREVIOUS DETECTION OF PRESENCE | NOT DETECTED MORE THAN 24 HOURS SINCE PREVIOUS DETECTION OF PRESENCE |

DETECTION DEVICE, INFORMATION INPUT DEVICE, AND WATCHING SYSTEM

FIELD

The present invention relates to a detection device, an information input device and a watching system.

BACKGROUND

Patent Literature 1 describes an individual identifying device which detects a finger rubbing sound generated by a user rubbing his/her fingers with a microphone, filters the detected signals to take out ultrasonic signals, performs feature extraction based on the ultrasonic signals, and compares the extracted feature information with prestored feature information to determine whether a coincidence occurs between these pieces of information.

Various information input devices have been proposed which use a bodily motion to control the operation of electrical appliances. Such known information input devices include, for example, those which detect audible sounds generated by a frictional motion of fingers (hereinafter, referred to as "finger snapping"), or detect the acceleration of a user's wrist (e.g., see Patent Literature 2), or detect the shape and motion of a user's palm (e.g., see Patent Literature 3) to input information. Such information input devices operated by using part of a human body are expected as user interfaces which can be intuitively operated without requiring pushes of many buttons.

Regarding technology for watching over individuals, watching systems sensing daily-life sounds have been proposed. For example. Patent Literature 4 describes a monitoring system which includes a sound sensor device installed in living space, processes sound signals with a microcontroller to generate spectrogram simplified in both time and frequency domains, transmits the spectrogram from a home gateway to a monitoring server through a network, and causes the monitoring server to apply filters to the spectrogram, to compute score values for the filters, and to identify the situation of a target on the basis of the score values.

CITATIONS LIST

Patent Literature

Patent Literature 1: Japanese Unexamined Patent Publication No. 2001-318691

Patent Literature 2: Japanese Unexamined Patent Publication No. 2006-319907 (page 1, FIG. 1)

Patent Literature 3: Japanese Unexamined Patent Publication No. 2014-085963 (page 1, FIG. 1)

Patent Literature 4: Japanese Unexamined Patent Publication No. 2011-237865 (page 1, FIG. 1)

SUMMARY

An object of the present invention is to provide a detection device for detecting inaudible sound waves generated by a user's bodily motion to identify the user's motion. Another object of the present invention is to provide a simple and reliable information input device which can output various kinds of operation information matching the operator's intention to an external appliance.

Another object of the present invention is to provide a watching system which can find out the living state of a watched person in a simple and correct manner and watch over him/her without worrying him/her about an invasion of privacy.

Provided is a detection device including: a detector detecting inaudible sound waves generated by a bodily motion; an acquiring unit acquiring burst information on at least one of the duration and frequency of a burst during which a cluster of pulses appears in a waveform of the inaudible sound waves detected by the detector; a memory storing reference information on reference values compared with the burst information, the reference values differing from each other depending on the types of bodily motions generating inaudible sound waves; and a determining unit comparing the burst information with the reference information to determine which of bodily motions has caused the inaudible sound waves detected by the detector.

Preferably, in the detection device, the detector detects ultrasound having a frequency not less than 20 kHz and not more than 70 kHz, as the inaudible sound waves.

Preferably, in the detection device, the acquiring unit acquires at least one of the values of the duration of the burst and the average frequency of the inaudible sound waves in the period of the burst, as the burst information.

Preferably, in the detection device, the acquiring unit acquires the value of the duration of the burst, based on which of predetermined discrimination ranges the peak value of an integrated waveform obtained from a full-wave rectified waveform of the inaudible sound waves detected by the detector falls within.

Preferably, in the detection device, the memory stores the burst information acquired by the acquiring unit from inaudible sound waves generated in advance by a user of the detection device, as the reference values.

Preferably, in the detection device, the acquiring unit acquires at least one of the ratio of the duration of bursts appearing in a predetermined determination period to the determination period and the difference between the average frequencies of the bursts, as the burst information.

Preferably, in the detection device, the detector further detects infrasound having a frequency not less than 1 Hz and less than 20 Hz, as the inaudible sound waves; the acquiring unit further acquires at least one of the duration of pulses included in the infrasound detected by the detector and an interval between the pulses; and the determining unit determines which of bodily motions has caused the inaudible sound waves, based on information on the duration or the interval.

Provided is an information input device including: a detector detecting inaudible sound waves generated by a bodily motion; an acquiring unit acquiring burst information on at least one of the duration and frequency of a burst during which a cluster of pulses appears in a waveform of the inaudible sound waves detected by the detector; a memory storing reference information on reference values compared with the burst information, the reference values differing from each other depending on the types of bodily motions generating inaudible sound waves; a determining unit comparing the burst information with the reference information to determine which of bodily motions has caused the inaudible sound waves detected by the detector; and an outputting unit outputting different pieces of operation information to an external appliance depending on a result of determination of the determining unit, the operation information being inputted to the external appliance for operating the external appliance.

Provided is a watching system including: a detector detecting inaudible sound waves generated by a bodily motion; an acquiring unit acquiring burst information on at least one of the duration and frequency of a burst during which a cluster of pulses appears in a waveform of the inaudible sound waves detected by the detector; a memory storing reference information on reference values compared with the burst information, the reference values differing from each other depending on the types of bodily motions generating inaudible sound waves; a determining unit comparing the burst information with the reference information to determine which of bodily motions has caused the inaudible sound waves detected by the detector; and a notifying unit notifying an external terminal of occurrence of a predetermined abnormal state, if a result of determination of the determining unit corresponds to the abnormal state.

Provided is an information input device detecting inaudible sound waves generated by a bodily motion to operate an external appliance, the information input device including: a detector detecting different inaudible sound waves as detection information; a memory storing the detection information, pieces of comparison information compared with the detection information, and operation signals for operating the external appliance, the operation signals being associated with the pieces of comparison information, respectively; and a determining unit comparing the detection information with the comparison information to determine whether detection information corresponding to a specific piece of comparison information is inputted, wherein the information input device outputs one of the operation signals based on a result of determination of the determining unit.

The inaudible sound waves may be generated by rubbing parts of a human body together.

The memory may store the detection information as the comparison information.

The waveform corresponding to the detection information subjected to signal processing may be converted to a burst; and the determining unit may determine whether detection information corresponding to a specific piece of comparison information is inputted, based on at least one of the duration and frequency of the burst.

The frequency may be the average frequency in a predetermined period.

Provided is a watching system detecting inaudible sounds generated in daily life to find out the state of a person in living space, the watching system including a detector placed in the living space to acquire inaudible sound information, and a notifying unit notifying the state of the person based on the inaudible sound information acquired by the detector.

Preferably, the inaudible sound information is at least one of ultrasound information and infrasound information.

Preferably, the notifying unit notifies the state of the person based on at least one of the ratio of the duration of a burst in the ultrasound information to a predetermined period and a frequency of the burst in the predetermined period.

Preferably, the frequency is the average frequency in the predetermined period.

Preferably, the notifying unit notifies the state of the person based on the width of a pulse in the infrasound information.

The detection device can detect inaudible sound waves generated by a user's bodily motion to identify the user's motion. The information input device is simple and reliable, and can output various kinds of operation information matching the operator's intention to an external appliance.

The watching system can find out the living state of a watched person in a simple and correct manner and watch over him/her without worrying him/her about an invasion of privacy.

BRIEF DESCRIPTION OF DRAWINGS

FIG. 4 is a table showing a correspondence between the frictional motions, characteristic extraction signals P3, pieces of comparison information Pt and operation signals Ps.

FIG. 6 is a diagram for explaining another example of detection of ultrasound.

FIG. 8 is a schematic diagram for explaining an example of usage of the information input device.

FIG. 9 is a diagram schematically showing examples of waveforms of ultrasound generated in daily life.

FIG. 19 is a waveform diagram showing an example of an infrasonic signal generated in living space.

FIG. 20 is a table for explaining an example of the temporal determination of the watching system 300.

DESCRIPTION OF EMBODIMENTS

Figure 1A:
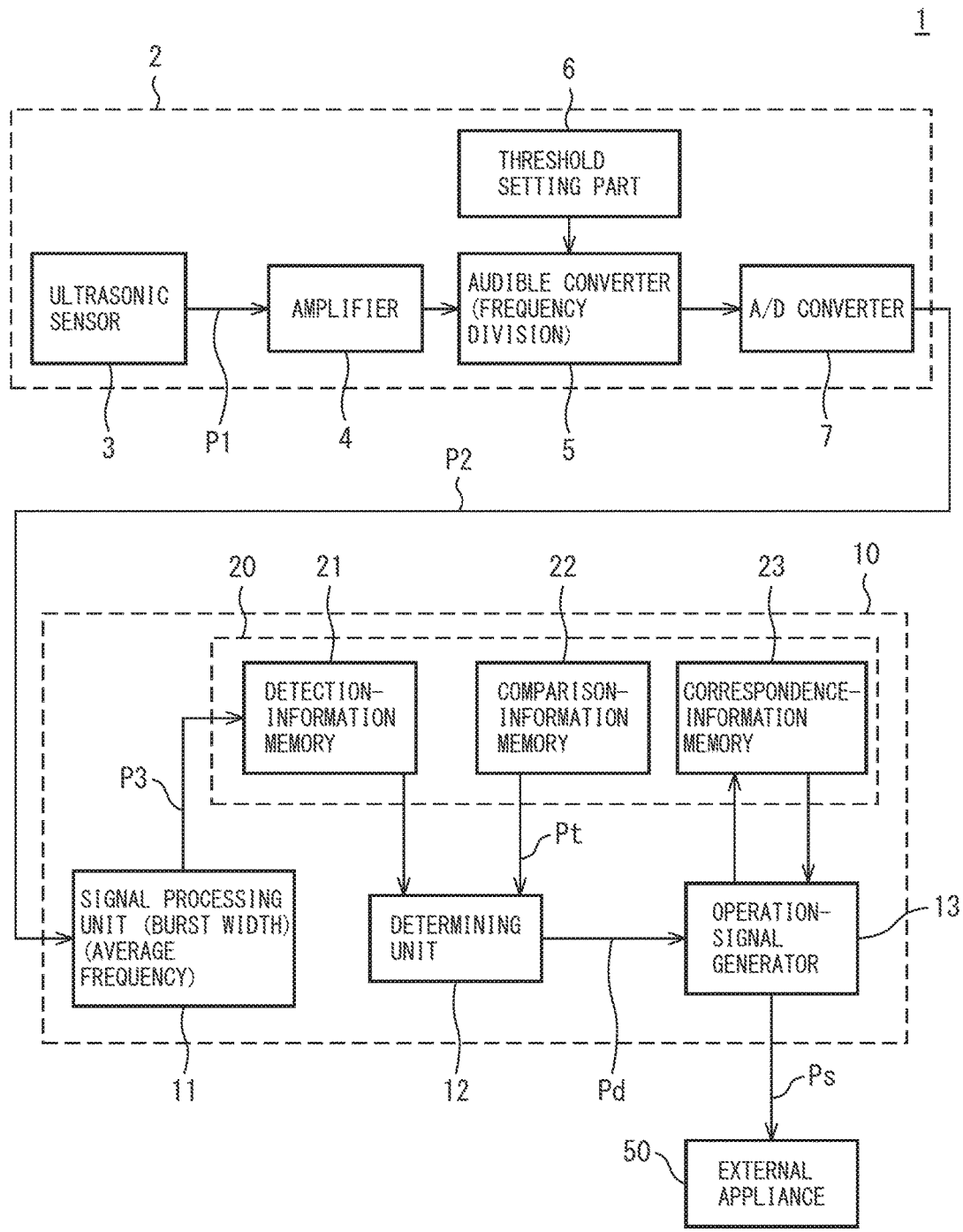
FIG. 1A is a block diagram of an information input device 1.

Hereinafter, based on the drawings, embodiments of the present invention will be explained in detail. Note that the following embodiments are examples for embodying the idea of the present invention, and are not intended to limit the present invention. In particular, the dimensions, materials, shapes and relative positions of the components described in the embodiments are not intended to limit the scope of the present invention only thereto, unless otherwise specified, and are merely examples for explanations. In the following descriptions, the same components will be referred to as the same name and assigned the same reference numeral, and detailed explanations thereof may be omitted.

First, a description will be given of information input devices which detect inaudible sound waves generated by a bodily motion to operate appliances.

In order to use an information input device which detects a signal generated by a bodily motion to input corresponding operation information to another device, such as an electrical appliance, if the information input device detects an audible sound generated by finger snapping to input information, for example, it is necessary to make a large audible sound by finger snapping. However, making a large audible sound by finger snapping is not necessarily easy; in particular, children and women who are not good at strongly snapping their fingers and people disabled in their hands or fingers have difficulty in operating such an information input device. Further, the information input device using an audible sound may cause an error due to noise signals resulting from various ambient noises, such as voices and daily-life sounds.

An information input device detecting the acceleration of a user's wrist to input information requires the user to put on a wristband-shaped acceleration sensor on his/her wrist, which is a nuisance for the user and also increases the cost of the device. An information input device detecting the shape and motion of a user's palm to input information needs to include a processor for processing motion video on the sensing side thereof and perform image mapping, which makes the device a large-scale system.

Hereinafter, a description will be given of simple information input devices which do not require a user to put on a sensor in advance nor need to include a large-scale system such as an image processing system. These information input devices are detection devices detecting inaudible sound waves generated by a specific bodily motion of an operator, and input operation information corresponding to the inaudible sound waves to a target appliance to operate it. Typical inaudible sound waves generated by a bodily motion include ultrasound generated by motions, such as clapping hands, rubbing fingers together, rubbing a human body and clothes together, opening and closing a mouth, sniffling, or handling a wheelchair or walking frame, etc. Hereinafter, a description will be given by taking ultrasound generated by a frictional motion of a human body as an example.

First Embodiment

FIG. 1A is a block diagram of an information input device 1. The solid arrows in FIG. 1A indicate a signal flow.

The information input device 1 includes a detector 2 and a controller 10. The detector 2 detects an ultrasonic signal (inaudible sound waves) generated by an operator rubbing part of his/her body, to generate a detection signal (detection information). The controller 10 is constructed from a microcomputer including a CPU and a memory, compares the detection information received from the detector 2 with prestored comparison information to determine the type of the detection information, and outputs an appropriate operation signal to an external appliance 50 based on the result of determination.

The detector 2 includes an ultrasonic sensor 3, an amplifier 4, an audible converter 5, a threshold setting part 6 and an A/D converter 7. The ultrasonic sensor 3 detects 20 to 70 kHz ultrasound generated by an operator rubbing part of his/her body, and converts it to an electric ultrasonic signal P1 (detection information). The amplifier 4 amplifies the ultrasonic signal P1 generated by the ultrasonic sensor 3.

The audible converter 5 performs frequency conversion to convert the ultrasonic signal P1 amplified by the amplifier 4 to an audio signal. This frequency conversion is frequency division which divides the frequency by 16, for example. The audible converter 5 also cuts off noise signals, such as ultrasound generated by lighting fixtures and electrical appliances. For example, the audible converter 5 removes ultrasound having a frequency not less than 70 kHz or a P-P (peak-to-peak) voltage less than 50 mV in the frequency division (frequency conversion). Thus, the audible converter 5 converts only an ultrasonic signal having a P-P voltage not less than 50 mV and a frequency not less than 20 kHz and less than 70 kHz to an audio signal.

The threshold setting part 6 sets the thresholds of frequencies and amplitudes (P-P voltages) cut off by the audible converter 5. The threshold setting part 6 initially sets those thresholds at 70 kHz and 50 mV. The audible converter 5 and threshold setting part 6 function as a noise filter cutting off noise signals having frequencies not less than the predetermined value.

The A/D converter 7 converts the analog audio signal obtained by the frequency conversion of the audible converter 5 to a digital detection signal P2 (detection information), and outputs it to the controller 10.

The reason why the audible converter 5 performs frequency division on the ultrasonic signal P1 to convert it to an audio signal is that the conversion of ultrasound to a low-frequency audio signal enables the controller 10 to perform circuit processing at low speed, thereby simplifying the circuitry and increasing reliability. However, the present invention is not limited to this particular case; if the processing speed of the controller 10 can be increased, the controller 10 may perform the following processing on the ultrasonic signal P1. If it is not necessary to remove noise signals during the use of the information input device 1, the audible converter 5 and threshold setting part 6 may be omitted, which simplifies the detector 2.

The controller 10 includes a signal processing unit 11, a determining unit 12, an operation-signal generator 13 and a memory 20. The signal processing unit 11, which is an example of the acquiring unit, acquires the digital detection signal P2 inputted from the detector 2, and extracts the duration (hereinafter, referred to as "burst width") and average frequency of a burst corresponding to a period during which substantially the same amplitude is maintained in the detection signal P2 (in other words, a period during which a cluster of pulses continuously appears). The burst width and average frequency are examples of the burst information. The signal processing unit 11 outputs the extracted values of the burst width and average frequency to detection-information memory 21, as a characteristic extraction signal P3 (characteristic information).

Figure 2A:
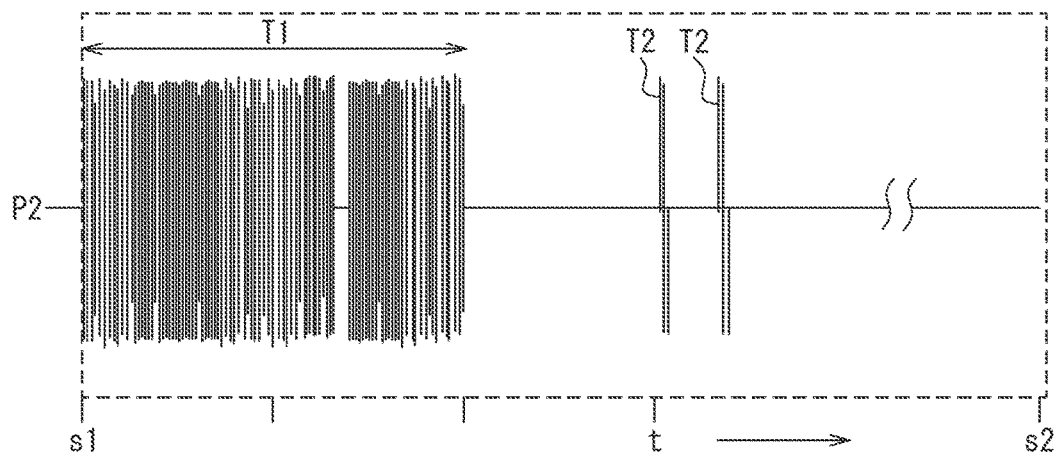
FIG. 2A is a waveform diagram of a detection signal P2 obtained from an ultrasonic signal.

FIG. 2A is a waveform diagram of a detection signal P2 obtained from an ultrasonic signal. FIG. 2A shows a detection signal P2 obtained from an ultrasonic signal which is generated by a frictional motion of an operator's body, detected by the ultrasonic sensor 3, and subjected to frequency division and A/D conversion by the audible converter 5 and A/D converter 7, respectively. The abscissa t and ordinate of FIG. 2A represent time and the wave level of the detection signal P2, respectively. FIG. 2A shows a detection signal P2 of ultrasound generated by finger snapping, as an example. In this detection signal P2, a continuous waveform continues for a period T1 from the starting point s1 of the frictional motion, followed by a no-wave period in which two single pulses T2 appear by the ending point s2.

Figure 2B:
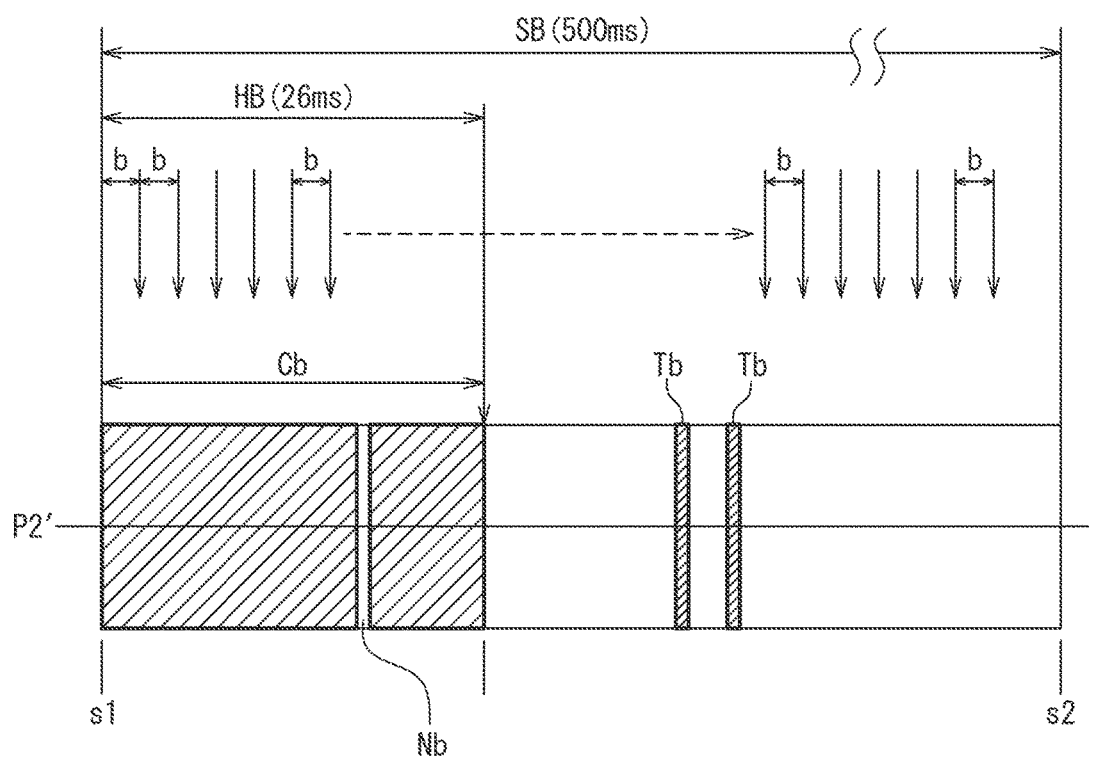
FIG. 2B is a schematic diagram for explaining how to create a characteristic extraction signal P3 based on the detection signal P2 shown in FIG. 2A.

FIG. 2B is a schematic diagram for explaining how to create a characteristic extraction signal P3 based on the detection signal P2 shown in FIG. 2A. FIG. 2B shows a detection signal P2' which schematically represents the detection signal P2 of FIG. 2A in a predetermined measurement range, i.e., a 500 ms interval SB from the starting point s1 to the ending point s2. In FIG. 2B, the burst is indicated by a hatched area. Defining every 1 ms interval as one block b, the waveform in the period T1 of FIG. 2A corresponds to a continuous burst Cb of blocks HB in FIG. 2B, while the two single pulses T2 in FIG. 2A correspond to short bursts Tb of one block in FIG. 2B. In the continuous burst Cb, a missing burst Nb of one block interval exists during which the waveform has no amplitude.

The signal processing unit 11 determines the presence or absence of the waveform in every block b, and measures the average frequency of the detection signal P2 in the blocks b where the wave exists. If a burst of one block or shorter is assumed to be a noise and discarded, the signal processing unit 11 discards the short bursts Tb and missing burst Nb, extracts the blocks HB from the detection signal P2 as a burst interval, and regards the other intervals as no-burst intervals. The signal processing unit 11 extracts the burst width (26 ms in the illustrated example) of the continuous burst Cb in the blocks HB and the average frequency (3.1 kHz in the illustrated example) in the period T1 during which the continuous burst Cb continues, and outputs these pieces of information to the memory 20 as a characteristic extraction signal P3.

Next, with reference to FIGS. 3A to 3F, a description will be given of examples of the detection signal P2 and characteristic extraction signal P3 obtained by a frictional motion of an operator's body. The upper part of each figure shows a detection signal P2. The abscissa and ordinate represent time and the wave level, respectively. This detection signal P2 is an audio signal obtained from an ultrasonic signal by dividing the frequency thereof by 16, similarly to the detection signal P2 shown in FIG. 2A. The lower part of each figure shows a characteristic extraction signal P3, and values of the burst width and average frequency thereof.

Figure 3A:
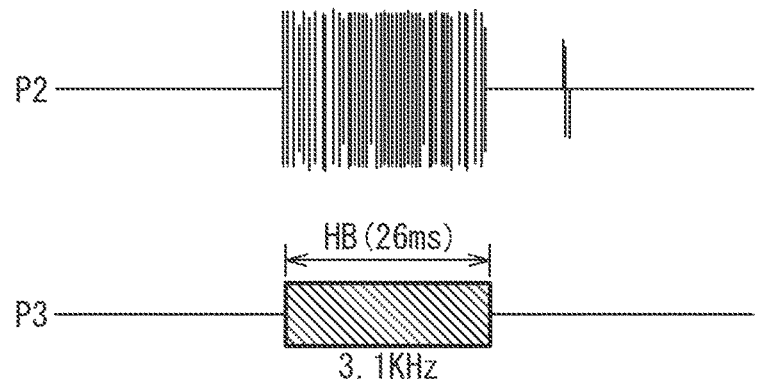
FIG. 3A is a diagram showing a detection signal P2 and a characteristic extraction signal P3 corresponding to finger snapping.
Figure 3B:
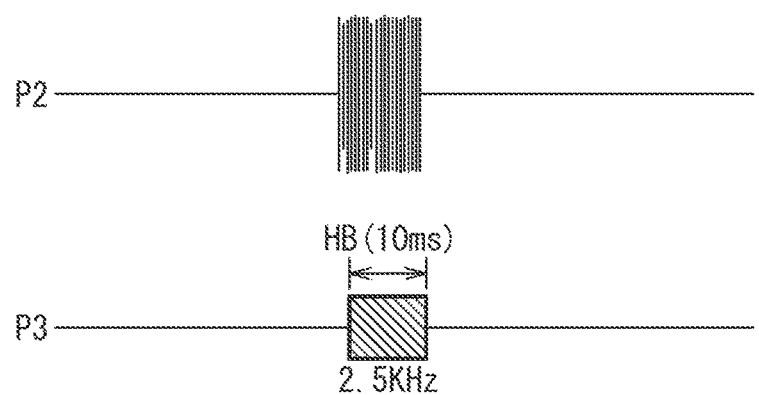
FIG. 3B is a diagram showing a detection signal P2 and a characteristic extraction signal P3 corresponding to nail flicking.
Figure 3C:
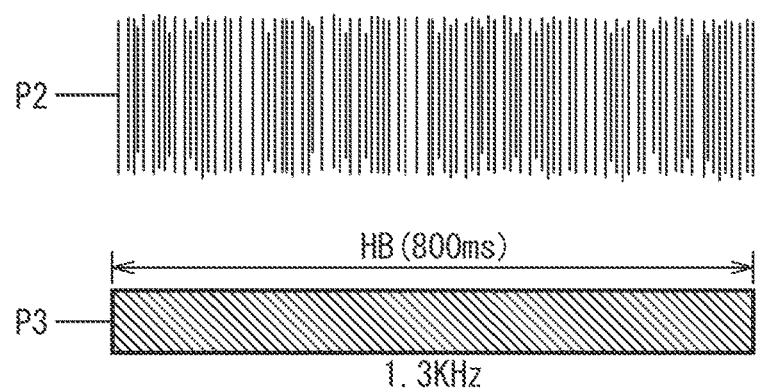
FIG. 3C is a diagram showing a detection signal P2 and a characteristic extraction signal P3 corresponding to palm rubbing.

FIG. 3A to 3C show detection signals P2 and characteristic extraction signals P3 generated by frictional motions of operator's hands. FIG. 3A is a diagram showing a detection signal P2 and a characteristic extraction signal P3 corresponding to finger snapping (rubbing a thumb and a little finger together sideways), which have already been explained with reference to FIGS. 2A and 2B. FIG. 3B is a diagram showing a detection signal P2 and a characteristic extraction signal P3 corresponding to nail flicking (flicking the nail of a forefinger with a thumb). FIG. 3C is a diagram showing a detection signal P2 and a characteristic extraction signal P3 corresponding to palm rubbing (rubbing the palms of both hands together).

In the example of "finger snapping" shown in FIG. 3A, the burst width and average frequency of the characteristic extraction signal P3 are 26 ms and 3.1 kHz, respectively, which have already been explained with reference to FIG. 2B. In the example of "nail flicking" shown in FIG. 3B, the burst width and average frequency of the characteristic extraction signal P3 are 10 ms and 2.5 kHz, respectively. In other words, in the example of "nail flicking," the burst width and average frequency are smaller than those of "finger snapping" shown in FIG. 3A. In the example of "palm rubbing" shown in FIG. 3C, the burst width of the characteristic extraction signal P3 is 800 ms, indicating that substantially the same amplitude is maintained during a predetermined measurement period, while the average frequency thereof is a relatively low value, 1.3 kHz.

Figure 3D:
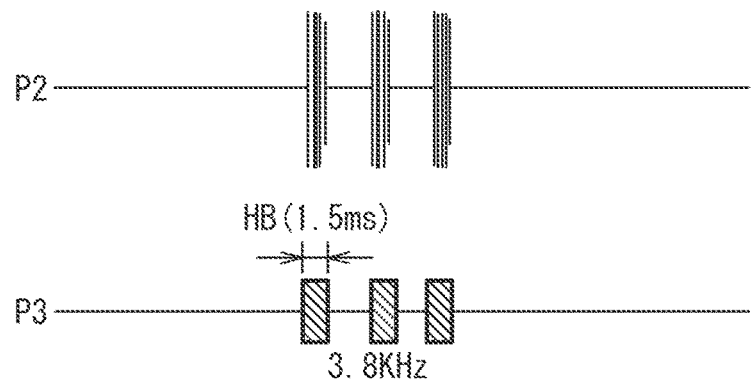
FIG. 3D is a diagram showing a detection signal P2 and a characteristic extraction signal P3 corresponding to mouth opening/closing.
Figure 3E:
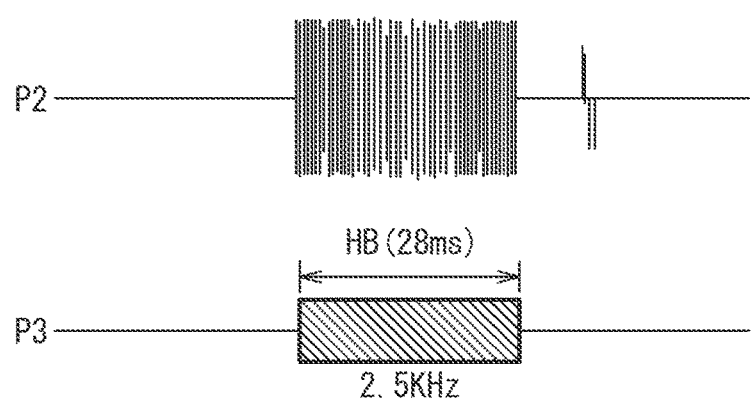
FIG. 3E is a diagram showing a detection signal P2 and a characteristic extraction signal P3 corresponding to clucking.
Figure 3F:
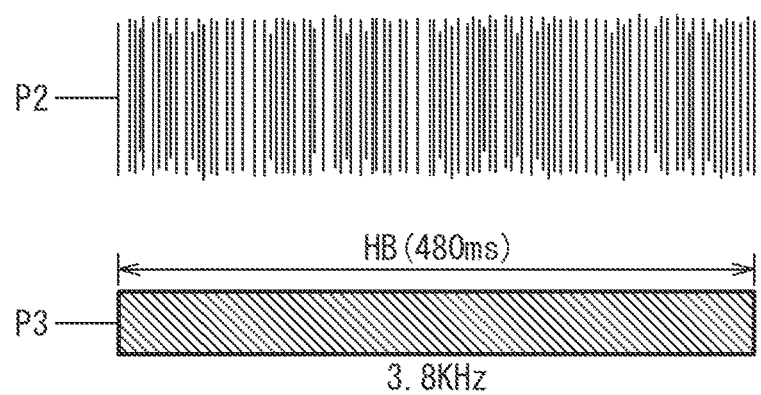
FIG. 3F is a diagram showing a detection signal P2 and a characteristic extraction signal P3 corresponding to sniffling.

FIG. 3D to 3F show detection signals P2 and characteristic extraction signals P3 generated by frictional motions of an operator's face. FIG. 3D is a diagram showing a detection signal P2 and a characteristic extraction signal P3 corresponding to mouth opening/closing (rubbing the upper and lower lips together by opening and closing the mouth). FIG. 3E is a diagram showing a detection signal P2 and a characteristic extraction signal P3 corresponding to clucking (clucking the tongue intermittently). FIG. 3F is a diagram showing a detection signal P2 and a characteristic extraction signal P3 corresponding to sniffling (continuously sniffling).

In the example of "mouth opening/closing" shown in FIG. 3D, the burst width and average frequency of the characteristic extraction signal P3 are 1.5 ms and 3.8 kHz, respectively. In the example of "clucking" shown in FIG. 3E, the burst width and average frequency of the characteristic extraction signal P3 are 28 ms and 2.5 kHz, respectively. In other words, in the example of "clucking," the average frequency is the same as that of "nail flicking" shown in FIG. 3B, while the burst width is larger than that of "nail flicking." In the example of "sniffling" shown in FIG. 3F, the burst width of the characteristic extraction signal P3 is 480 ms, indicating that substantially the same amplitude is maintained for almost all the predetermined measurement period. In the example of "sniffling," the average frequency is 3.8 kHz, which is the same as that of "mouth opening/closing" shown in FIG. 3D.

The memory 20 includes detection-information memory 21, comparison-information memory 22 and correspondence-information memory 23. The detection-information memory 21 stores the detection signal P2 received from the detector 2 and the characteristic extraction signal P3 extracted by the signal processing unit 11 from the detection signal P2.

The comparison-information memory 22 stores pieces of comparison information Pt compared with the detection information for identifying the pattern of the detection information. Each piece of comparison information Pt includes reference values of the burst width and average frequency, which are characteristic information on an ultrasonic signal generated by a corresponding frictional motion of an operator.

The correspondence-information memory 23 stores operation signals Ps (Ps1 to Psn) respectively corresponding to the pieces of comparison information Pt (Pt1 to Ptn) stored in the comparison-information memory 22. In other words, the memory 20 stores the pieces of comparison information Pt (Pt1 to Ptn) and the operation signals Ps (Ps1 to Psn) associated with each other. The operation signals Ps are signals (operation information) for operating the external appliance 50.

FIG. 4 is a table showing a correspondence between the frictional motions, characteristic extraction signals P3, pieces of comparison information Pt, and operation signals Ps. FIG. 4 shows the above-mentioned frictional motions, the burst widths and average frequencies of the characteristic extraction signals P3 obtained by these frictional motions, and the burst widths and average frequencies of the comparison information Pt and the operation signals Ps respectively corresponding to these frictional motions.

The characteristic extraction signals P3 are characteristic information extracted from the detection information, and correspond to measured data of the detection information. In contrast, each piece of comparison information Pt has a certain range, in view of the fact that the detection information varies due to variations between individuals and motions. In order to prevent errors, the numerical range of each piece of comparison information Pt is set so as to cover the variation range of data obtained by repeatedly measuring the corresponding frictional motion; the larger the variations of the detection information, the wider the numerical range. Of the information shown in FIG. 4, the pieces of comparison information Pt and operation signals Ps are stored in the comparison-information memory 22 and correspondence-information memory 23, respectively.

In FIG. 4, for the frictional motion "finger snapping," the burst width and average frequency of the characteristic extraction signal P3 are 26 ms and 3.1 kHz; those of the comparison information Pt are 16 to 48 ms and 3.5 to 4 kHz; the operation signal is Ps1. For the frictional motion "nail flicking," the burst width and average frequency of the characteristic extraction signal P3 are 10 ms and 2.5 kHz; those of the comparison information Pt are 5 to 12 ms and 2 to 3 kHz the operation signal is Ps2. For the frictional motion "palm rubbing," the burst width and average frequency of the characteristic extraction signal P3 are 800 ms and 1.3 kHz; those of the comparison information Pt are 500 ms or more and 1 to 1.5 kHz; the operation signal is Ps3.

For the frictional motion "mouth opening/closing," the burst width and average frequency of the characteristic extraction signal P3 are 1.5 ms and 3.8 kHz; those of the comparison information Pt are 1 to 2 ms and 3.5 to 4 kHz; the operation signal is Ps4. For the frictional motion "clucking," the burst width and average frequency of the characteristic extraction signal P3 are 28 ms and 2.5 kHz; those of the comparison information Pt are 16 to 32 ms and 2 to 3 kHz; the operation signal is Ps5. For the frictional motion "sniffling," the burst width and average frequency of the characteristic extraction signal P3 are 480 ms and 3.8 kHz; those of the comparison information Pt are 400 to 500 ms and 3.5 to 4 kHz; the operation signal is Ps6.

The determining unit 12 acquires the characteristic extraction signal P3 stored in the detection-information memory 21 and the pieces of comparison information Pt stored in the comparison-information memory 22, and determines the pattern of ultrasound matching the intention of the operator, based on these pieces of information. To this end, the determining unit 12 compares the burst width and average frequency of the characteristic extraction signal P3 with the burst widths and average frequencies of the comparison information Pt, and selects one of the pieces of comparison information Pt1 to Ptn whose predetermined ranges the burst width and average frequency of the characteristic extraction signal P3 fall within. Thereby, the determining unit 12 identifies the frictional motion having generated the ultrasound corresponding to the characteristic extraction signal P3, and outputs one of the specifying signals Pd (Pd1 to Pdn) corresponding to the identified frictional motion to the operation-signal generator 13. The specifying signals Pd (Pd1 to Pdn) respectively correspond to the pieces of comparison information Pt (Pt1 to Ptn), and are used for specifying one of the pieces of comparison information Pt.

The operation-signal generator 13, which is an example of the outputting unit, outputs one of the operation signals Ps stored in the correspondence-information memory 23 to the external appliance 50, based on the result of determination of the determining unit 12; the outputted operation signal Ps corresponds to the specifying signal Pd (Pd1 to Pdn) supplied from the determining unit 12. For example, if the specifying signal Pd supplied from the determining unit 12 is Pd1, the operation-signal generator 13 outputs the operation signal Ps1 corresponding to the specifying signal Pd1 to the external appliance 50. The operation-signal generator 13 outputs different operation signals Ps depending on the types of frictional motions of an operator's body. More specifically, the operation-signal generator 13 outputs the operation signals Ps1 to Ps6, when the operator performs "finger snapping," "nail flicking," "palm rubbing," "mouth opening/closing," "clucking" and "sniffling," respectively.

The controller 10 may further include an operation signal converter converting the operation signals Ps to signals adapted to the external appliance 50.

Figure 5:
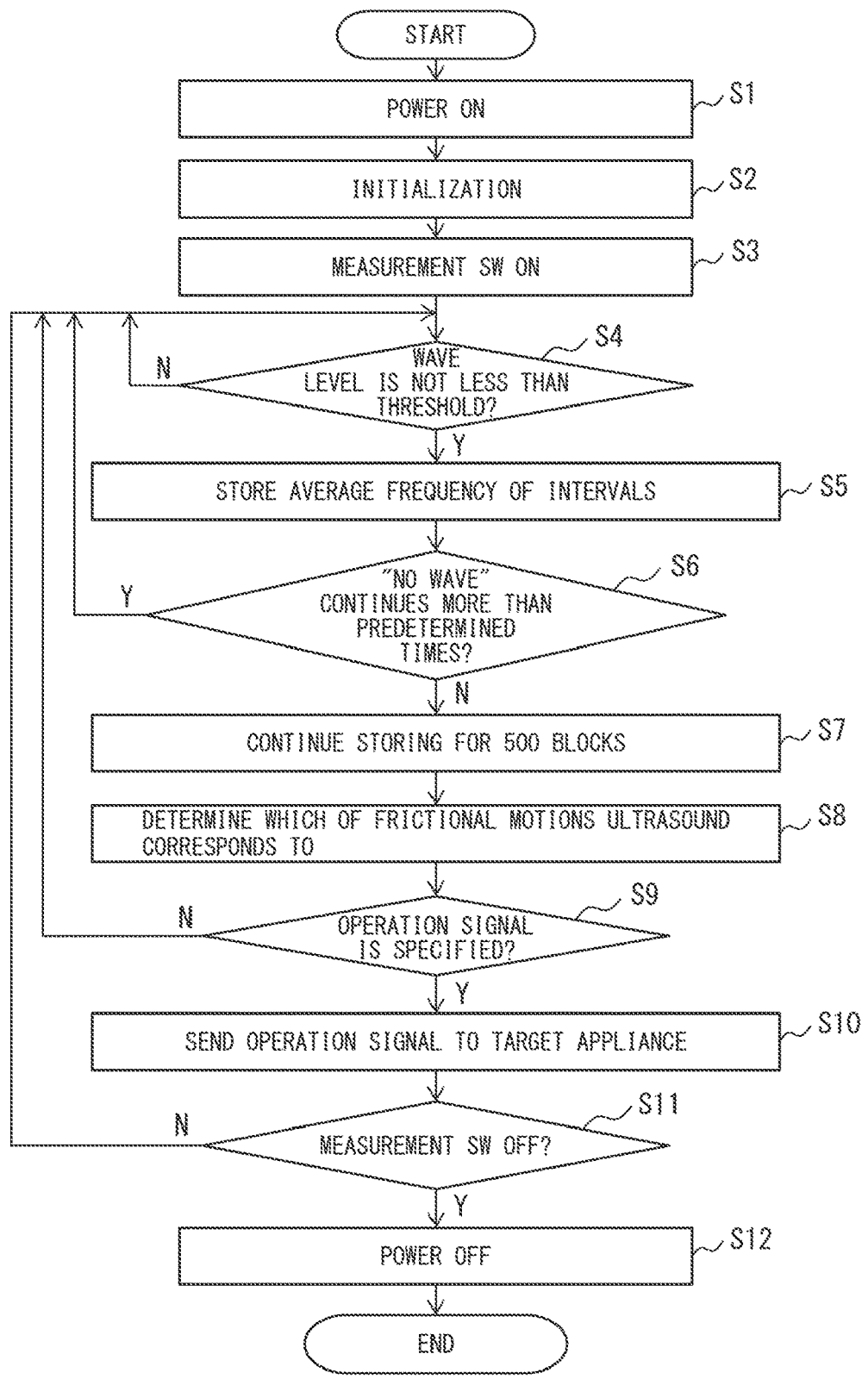
FIG. 5 is a flowchart showing an operational example of the information input device 1.

FIG. 5 is a flowchart showing an operational example of the information input device 1. When the power is turned on (step S1), the controller 10 of the information input device 1 first performs initialization, such as setting of the thresholds used by the audible converter 5 (step S2). Then, when an operator sets a measurement switch (not shown) to ON (step S3), the signal processing unit 11 determines whether the wave level of the detection signal P2 detected by the detector 2 is not less than the threshold (step S4). If the wave level is not less than the threshold (Yes in step S4), the signal processing unit 11 determines the presence or absence of the wave (amplitude) of the detection signal P2 for every interval (block) of 1 ms, calculates the burst width and average frequency of the intervals where the wave exists, and stores these values in the memory 20 (step S5).

The signal processing unit 11 determines whether "no wave" has continued for a period of a predetermined number of blocks (e.g., 5 blocks) since storing the average frequency was started (step S6). If "no wave" continues for this period (Yes in step S6), the process returns to step S4 otherwise (No in step S6), the storing is continued for a predetermined measurement period (e.g., 500 blocks) (step S7). Then, the determining unit 12 compares the obtained burst width and average frequency with the pieces of comparison information Pt in the memory 20, to determine which of frictional motions the detected ultrasound corresponds to (step S8).

If an operation signal Ps is not specified by the determination in step S8 (No in step S9), the process returns to step S4; otherwise (Yes in step S9), the operation-signal generator 13 sends the operation signal Ps to the target appliance (step S10). Thereafter, unless the measurement switch is set to OFF (No in step S11), the process returns to step S4; otherwise (Yes in step S11), the controller 10 turns off the power (step S12) and terminates the process.

In the information input device 1, when ultrasound is generated by a frictional motion of part of an operator's body, the detector 2 detects the ultrasound to generate detection information, while the controller 10 supplies the operation signal Ps corresponding to the detection information to the external appliance 50. Since the characteristic extraction signal P3 varies depending on the types of frictional motions, the use of such characteristic extraction signals P3 for inputting operation information to an external appliance enables operators to operate the external appliance as they wish.

For example, since the burst widths of "finger snapping" and "clucking" are 26 ms and 28 ms, respectively, and close to each other, it is difficult to distinguish them based on only the burst widths. However, since the average frequency 3.8 kHz of "finger snapping" is considerably different from the average frequency 2.5 kHz of "clucking," the combination of the burst width and average frequency allows for determining which of frictional motions the detection information corresponds to.

Note that the use of the combination of the burst width and average frequency obtained from the detection information is not a condition necessary to determine which of frictional motions the detection information corresponds to. For example, as shown in FIG. 4, large differences exist between "finger snapping," "nail flicking" and "palm rubbing" in both the burst widths and average frequencies. Thus, limiting the detection targets to ultrasound generated by frictional motions of hands allows for identifying the frictional motions based on only one of the burst width and average frequency. However, if the number of types of frictional motions to be detected and that of operation signals Ps are large as described above, determination based on the combination of the burst width and average frequency has the advantage of improving accuracy.

FIG. 6 is a diagram for explaining another example of detection of ultrasound. FIG. 6 shows the waveforms of an ultrasonic signal US1 and a signal US2 obtained by full-wave rectification of the ultrasonic signal US1, and an integrated waveform US3 of the signal US2, in the order from top to bottom. In each waveform, the abscissa and ordinate represent time t and the wave level, respectively. The signal processing unit 11 may generate an integrated waveform US3 from an ultrasonic signal US1, and acquire the value of the burst width based on the peak value of the integrated waveform US3, instead of determining the presence or absence of the wave for every interval of 1 ms to detect the burst width of the ultrasonic signal as described above. To this end, different discrimination ranges may be defined in advance for determining the burst width; and the signal processing unit 11 may acquire the value of the burst width based on which of the discrimination ranges the peak value of the integrated waveform US3 falls within. For example, if the peak value falls within a discrimination range AA, the signal processing unit 11 may determine that the burst width has a length corresponding to the discrimination range AA.

Figure 1B:
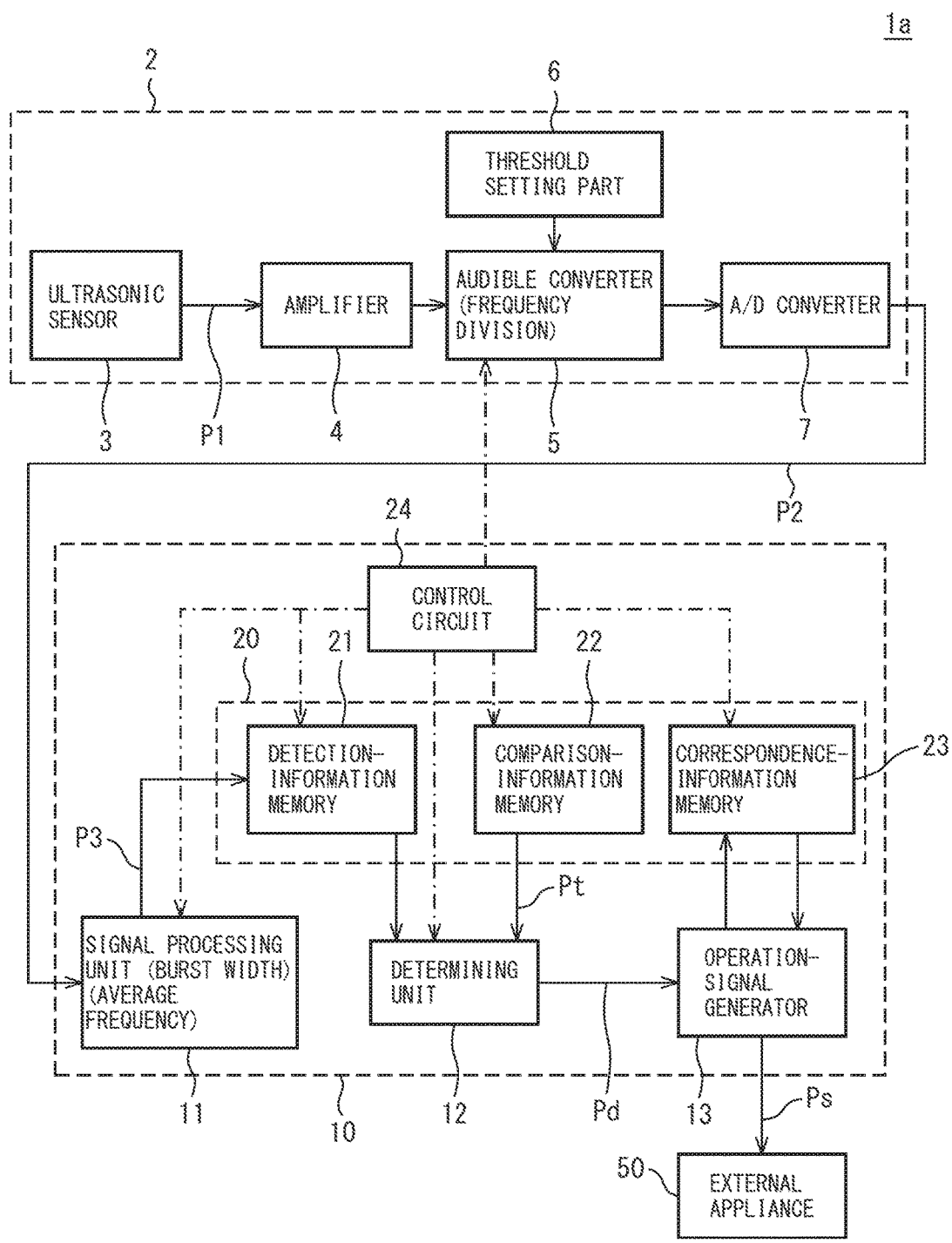
FIG. 1B is a block diagram showing a modified example of the information input device 1.

FIG. 1B is a block diagram showing a modified example of the information input device 1. As in the information input device 1a shown in FIG. 1B, the controller 10 may include a control circuit 24 to control the operations of the audible converter 5, signal processing unit 11, determining unit 12 and memory 20. This allows for appropriately controlling the operation timing of each component.

Although the examples of inaudible sound waves generated by rubbing body parts together have been described above, the inaudible sound waves detected by the information input device (detection device) may be ultrasound generated by rubbing a human body and others, such as clothes and instruments, or rubbing instruments together (e.g., rubbing of mechanical portions of a driven wheelchair or walking frame), or infrasound generated by a motion such as swinging an arm widely. Detecting such inaudible sound waves allows for similarly operating an appliance.

Second Embodiment

Figure 7:
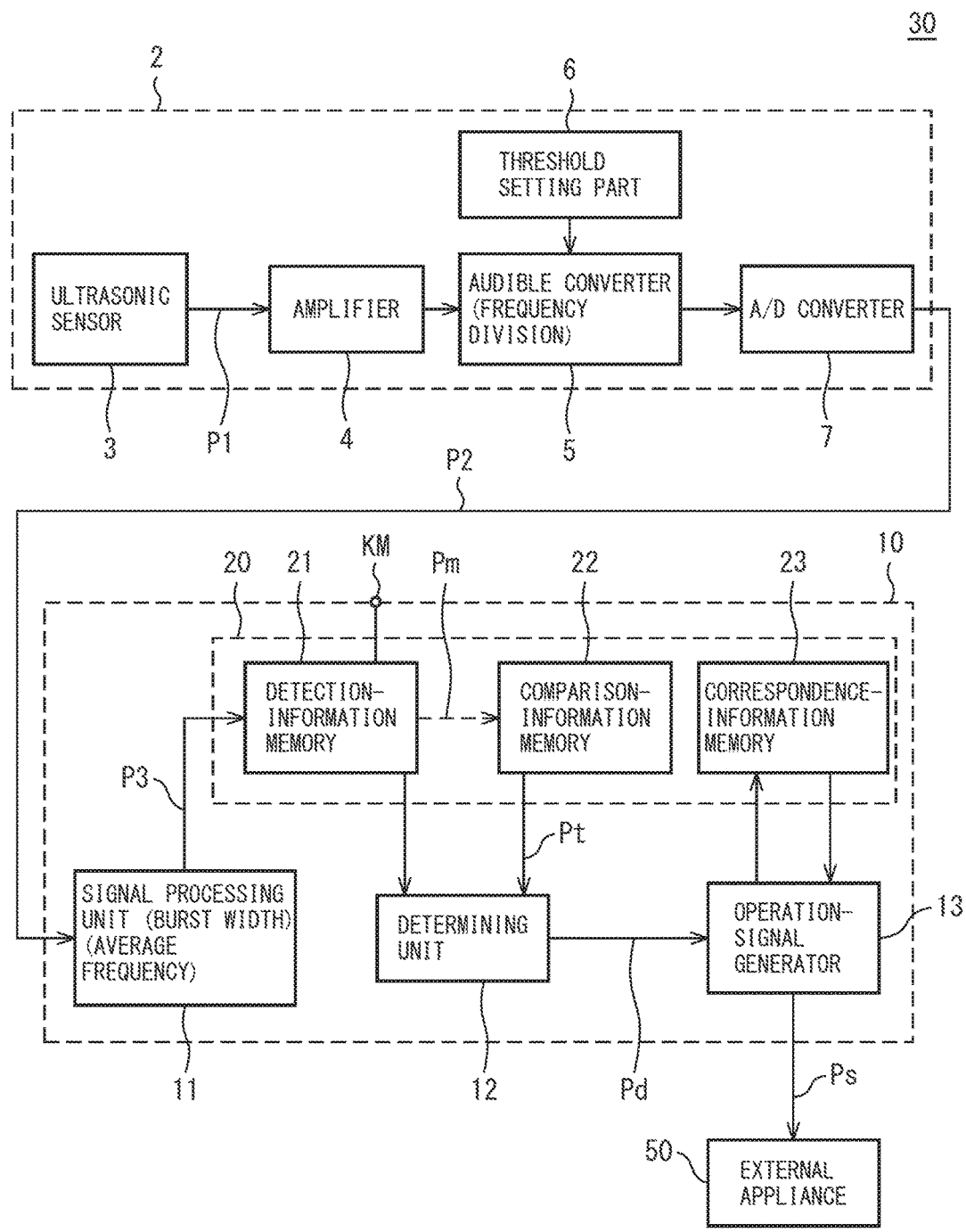
FIG. 7 is a block diagram of an information input device 30.

FIG. 7 is a block diagram of an information input device 30. The information input device 30 differs from the information input device 1 shown in FIG. 1A in that the controller 10 further includes a switch KM and a line Pm connecting the detection-information memory 21 and comparison-information memory 22 for writing comparison data and in that the comparison-information memory 22 stores different comparison information Pt. Since the information input device 30 is identical in structure to the information input device 1 in the other respects, descriptions already given will not be repeated.

The information input device 1 stores predetermined average reference values, as the comparison information Pt, while the information input device 30 stores characteristic information extracted from detection signals P2 caused by a specific operator performing frictional motions with his/her body, as the comparison information Pt, in the comparison-information memory 22. In other words, the information input device 30 is an information input device customized to the operator.

The switch KM is used for selecting where to output data from the detection-information memory 21 of the controller 10. Throwing the switch KM sets the information input device 30 to a mode for writing comparison data. If ultrasound is generated by a frictional motion of an operator's body in this state, the detector 2 generates a detection signal P2 as described above, and outputs it to the signal processing unit 11. The signal processing unit 11 measures the burst width and average frequency of the inputted detection signal P2, outputs these values as a characteristic extraction signal P3 to the detection-information memory 21, and further writes them into the comparison-information memory 22 through the line Pm extending from the detection-information memory 21. The comparison-information memory 22 stores this characteristic extraction signal P3 as a piece of comparison information Pt. Repeating this procedure in a predetermined order allows for storing multiple pieces of comparison information Pt in the comparison-information memory 22.

Storing information generated by detecting frictional motions of a specific person as the comparison information Pt as in the information input device 30 extremely improves the accuracy of determination and thus leads to a customized information input device without errors, since the determining unit 12 compares the detection signal P2 and comparison information Pt which are obtained by frictional motions of this person.

Third Embodiment

FIG. 8 is a schematic diagram for explaining an example of usage of the information input device. FIG. 8 shows an example where the information input device 1, 1a or 30 is incorporated into a television 100 or a remote controller 200. In general, a television 100 is operated with a remote controller 200. However, incorporating the information input device into a television 100 allows for operating the television 100 not only with a remote controller 200, but also with ultrasonic signals generated by frictional motions of a human body. This example corresponds to the case where the external appliance 50 in FIGS. 1A, 1B and 7 is the television 100.

For example, assuming that the operation signal Ps1 of "finger snapping" shown in FIG. 4 is a power-on signal, the first "finger snapping" turns on the power of the television 100, while the second "finger snapping" turns off the power. In this case, repeating "finger snapping" allows for turning on and off the power of the television 100.

Assume that the operation signal Ps2 of "nail flicking" and the operation signal Ps3 of "palm rubbing" are signals for increasing and decreasing the number of the channel, respectively. Then, when the power is on, repeating "nail flicking" increases the number of the channel, while intermittently repeating "palm rubbing" decreases it. Further, assume that the operation signal Ps4 of "mouth opening/closing" and the operation signal Ps5 of "clucking" are signals for turning up and down the volume, respectively. Then, repeating "mouth opening/closing" turns up the volume, while repeating "clucking" turns it down.

For example, an operator of the television 100 can turn on the power by "finger snapping," set the channel by "nail flicking" and "palm rubbing," and further adjust the volume by "mouth opening/closing" and "clucking" to see a program, and thereafter can turn off the power by "finger snapping." In this way, the television 100 can be operated only by frictional motions of a body without using the remote controller 200, which is very convenient since there is no need to look for the remote controller 200.

Of course, the correspondence between rubbed portions and performed functions is not limited to the above-described one, and can be arbitrarily defined according to the usability for an operator. Alternatively, the information input device 1, 1a or 30 may be incorporated into the remote controller 200, and output an operation signal corresponding to a detected ultrasonic signal generated by a frictional motion, from the remote controller 200 to the television 100.

The information input devices are also applicable to operate various devices other than a television. For example, the ultrasonic signal of "finger snapping" may be used for operating the shutter of a camera. This way of operation is better than the conventional way using an audible sound of "finger snapping," since this operation can be performed even by a person who cannot generate a large audible sound by "finger snapping" and there is no need to worry about errors due to external noise signals.

If the information input device is incorporated into a personal computer, even people who are disabled in their hands and have difficulty in typing on a keyboard can operate the computer by a frictional motion of their bodies. Alternatively, the information input device may be incorporated into an USB device. Attaching this USB device to a personal computer allows for similarly operating the computer by a frictional motion of a human body.

The information input device may be used to control the motion of a toilet door, for example. In this case, the information input device can detect ultrasound generated by rubbing of mechanical portions of a wheelchair or walking frame, thereby determining that a user thereof has come, and can automatically control unlocking of the door and the time during which the door is unlocked, depending on the result of determination.

Next, a description will be given of watching systems watching over the living state of a person who lives alone, such as a single elderly person.

In recent years, social structures have become complicated, and the number of people who live alone, such as single elderly people and workers and students living away from their families, has been increased. In particular, solitary death of a single elderly person in an apartment leads to problems, such as a fall of its asset values and difficulty in renting the apartment again. Not to mention serious problems such as solitary death, checking the health and safety of such single people remains urgent and important matters to be addressed. Further, also in the community, there are many cases where individuals in a closed space, such as a public toilet, a private room in a cafe, a karaoke room and a prison cell, should be watched over.

Hence, watching over individuals has become a matter to be addressed not only by families but also the whole society. For example, the following devices have become commercial; an infrared pyroelectric sensor for watching over motions of a single elderly person, a microwave Doppler sensor for sensing vital signs, a device for monitoring the opening and closing of a door, a device for monitoring the consumption of currents in an electrical appliance, such as an electric hot pot, and a device for monitoring motions with a camera.

However, conventional systems for watching over living space have problems of privacy and system prices. More specifically, since such a system includes an audible sound sensor placed in living space, data of sensed audible sounds, such as conversations, is stored in the system until it is converted to spectrogram. Thus, there is a risk of misusing this audible sound data, and a fundamental problem that watched people keep worrying about the collection of daily-life sounds related to privacy. Further, such a system requires a means for generating spectrogram from audible daily-life sounds, which makes the system complicated and increases its cost.

Hereinafter, a description will be given of watching systems finding out the living state of a watched person in a simple and correct manner, without problems of privacy. These watching systems are detection devices detecting inaudible sound waves generated by a watched person in daily life, infers his/her actions or motions at that moment based on the detected inaudible sound waves, determines whether the person is in a normal living state, and notifies the outside immediately if it is determined that he/she is in an abnormal state. Since inaudible sound waves generated in daily life include ultrasound and infrasound, a description will be given below of an example where only ultrasound is detected and another example where both ultrasound and infrasound are detected.

Ultrasound generated in general living space is a 20 to 70 kHz sound wave, and is generated mainly by contacting objects with each other, rubbing or bumping them against each other, abnormal breathing or wriggling of a person, or the like. The frequency thereof depends on the hardness and surface roughness of the objects, or the narrowness of the person's airway. In other words, the frequency, amplitude and duration of ultrasound are specific to its source. Thus, analysis of ultrasound allows for identifying the phenomenon which has caused the ultrasound. Further, detecting inaudible ultrasound to find out the state of the watched person has the advantage of avoiding problems related to his/her privacy, since detection of voices is not necessary.

Infrasound is a low-frequency wave having a frequency less than 20 Hz, and is generated in daily life mainly by strongly contacting heavy objects with each other, bumping them against each other, or tumbling of a person, or the like. Similarly to ultrasound, since infrasound is an inaudible sound, detecting it does not cause problems related to privacy of the watched person.

FIG. 9 is a diagram schematically showing examples of waveforms of ultrasound generated in daily life. Graphs G1 to G4 in FIG. 9 show waveforms obtained by detecting different types of ultrasound in ordinary living space S with an ultrasonic sensor. The abscissa t and ordinate A of each graph represent time and the amplitude level (intensity) of ultrasound, respectively.

Graph G1 shows a waveform of ultrasound generated by a water flow from a faucet, which is characterized by pulses of short duration. Graph G2 shows a waveform of ultrasound generated by a person P walking in a room, which is characterized by pulses appearing at regular intervals according to the walking speed. Graph G3 shows a waveform of ultrasound generated by a person P opening a door, which is characterized by a burst of long duration. Graph G4 shows waveforms of ultrasound generated by a person P in a period from entering a toilet to flushing the toilet, which are characterized by different shapes corresponding to a series of motions including locking the toilet (G41), lowering a toilet seat (G42), using toilet paper (G43), using a washing function of the toilet seat (G44) and flushing (G45).

Figure 10A:
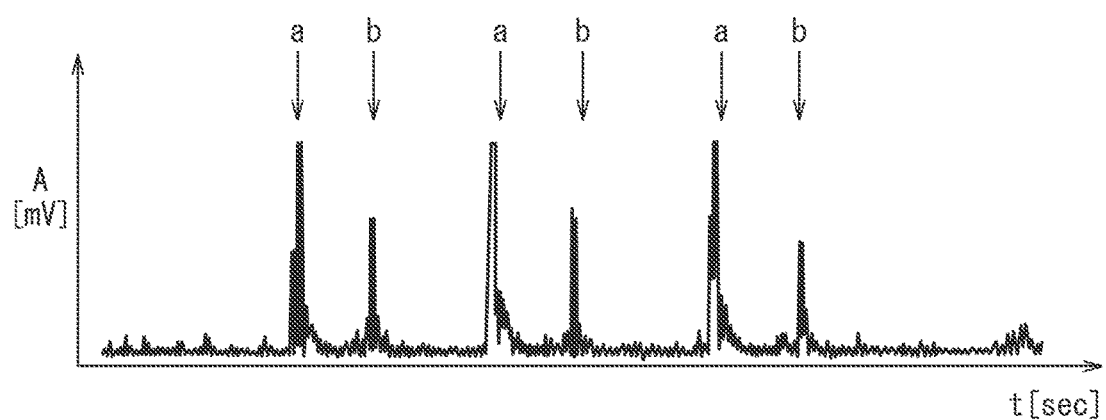
FIG. 10A is a waveform diagram showing an example of infrasound generated in daily life.
Figure 10B:
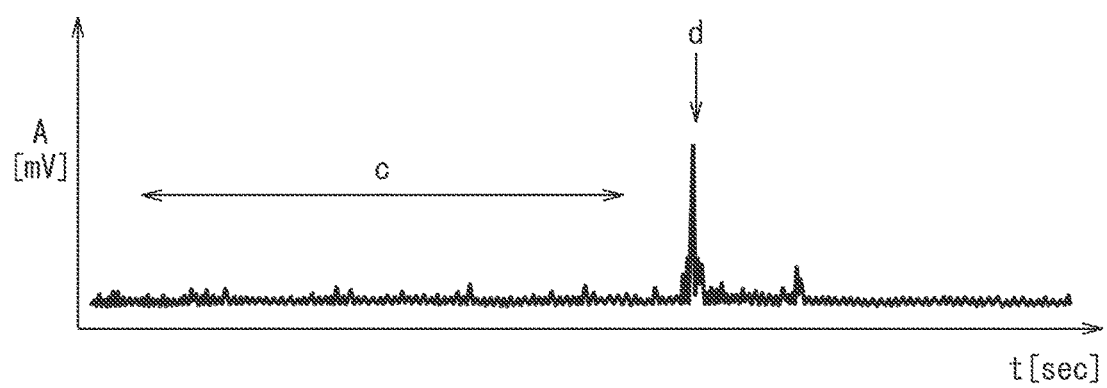
FIG. 10B is a waveform diagram showing an example of infrasound generated in daily life.

FIGS. 10A and 10B are waveform diagrams showing examples of infrasound generated in daily life. FIGS. 10A and 10B show waveforms of infrasound generated by a person opening or closing a door, and infrasound generated by tumbling of a person, respectively. The abscissa t and ordinate A of each figure represent time and the sound pressure level (intensity) of infrasound, respectively. In the example of FIG. 10A, a pair of pulses having different levels is generated at timing (a) when the door is opened and timing (b) when the door is closed. In FIG. 10B, arrow c indicates a waveform in a period where a person is walking or standing still, while arrow d indicates a waveform when a person tumbles. As shown in FIG. 10B, tumbling causes a sudden pulse-like waveform of short duration.

Fourth Embodiment

Figure 11:
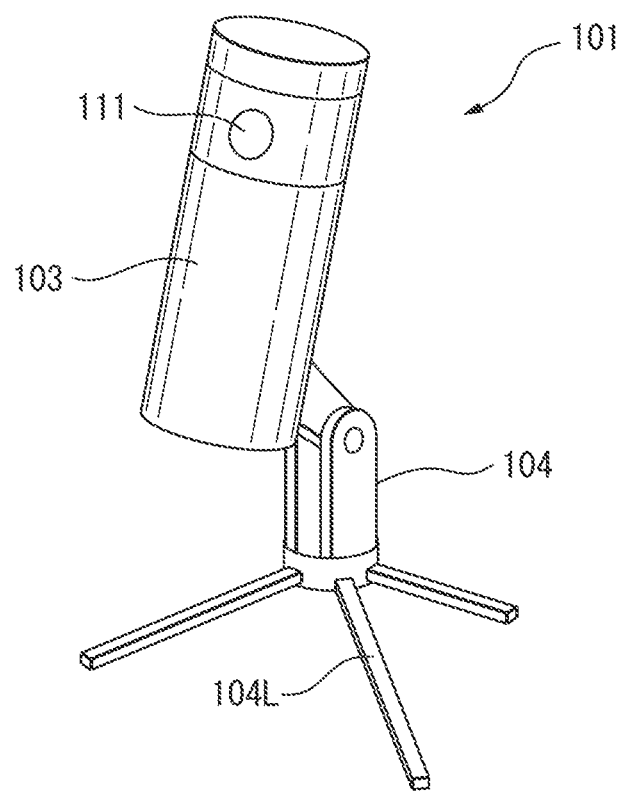
FIG. 11 is a diagram showing the appearance of a watching system 101.

FIG. 11 is a diagram showing the appearance of a watching system 101. The watching system 101 achieves the function of detecting ultrasound in living space to watch over the state of a watched person. As shown in FIG. 11, the watching system 101 is composed of a system body 103 including an ultrasonic sensor 11, and a support 104 including legs 104L fixing and holding the system body 103, and is placed near the watched person. The watching system 101 does not have any switches on the outside thereof so that the watched person may not arbitrarily operate a power switch or a setting switch to cut off the power or stop its function. The watching system 101 is controlled through a wired or wireless network by an external appliance (external terminal 140 described later) (not shown in FIG. 11) placed in a control room or the like where an operator watches over the living space.

Figure 12:
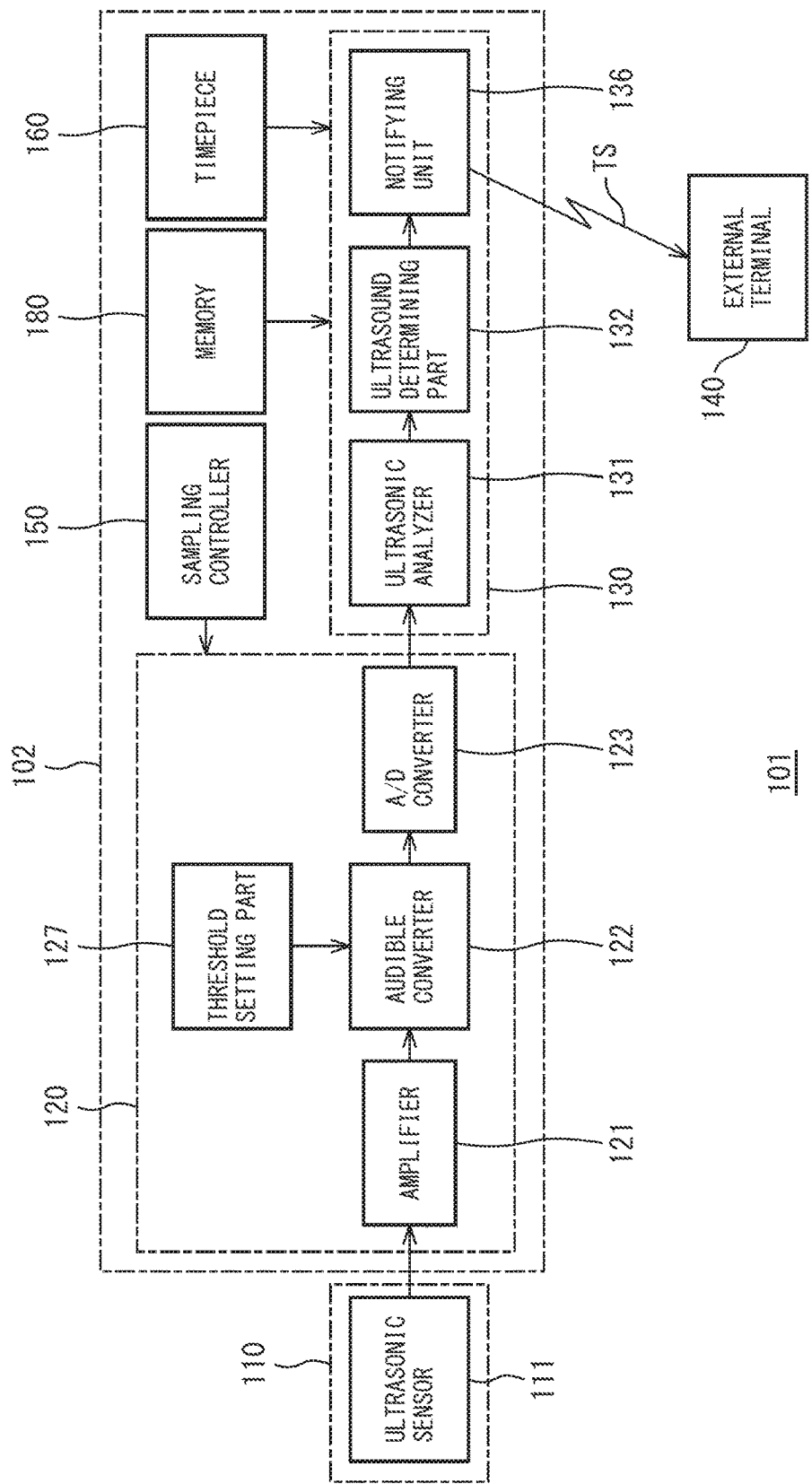
FIG. 12 is a block diagram of the watching system 101.

FIG. 12 is a block diagram of the watching system 101. As shown in FIG. 12, the watching system 101 includes a detector 110 and a notifying device 102. The detector 110 includes an ultrasonic sensor 111. The notifying device 102 is constructed from a microcomputer including a CPU and a memory, and includes a signal processing unit 120, a determining unit 130, a sampling controller 150, a timepiece 160 and a memory 180. The detector 110 as well as the signal processing unit 120 and determining unit 130 in the notifying device 102 will be referred to as an "ultrasonic processor" for the sake of explanation, since they detect and process ultrasound generated in living space.

The ultrasonic sensor 111 in the detector 110 is constructed from a ceramic piezoelectric element having high directivity, for example, detects ambient ultrasound having a frequency more than 20 kHz, converts it to an electric signal, and outputs it to an amplifier 121 in the signal processing unit 120.

The signal processing unit 120 includes an amplifier 121, an audible converter 122, an A/D converter 123 and a threshold setting part 127. The amplifier 121 amplifies the electric signal (ultrasonic signal) inputted from the detector 110.

The audible converter 122 performs frequency conversion to convert the ultrasonic signal amplified by the amplifier 121 to an audio signal. This frequency conversion is frequency division which divides the frequency by 16, for example. The audible converter 122 also cuts off noise signals, such as ultrasound generated by lighting fixtures and electrical appliances (a refrigerator or the like). For example, in the frequency division (frequency conversion), the audible converter 122 removes ultrasound having a frequency not less than 50 kHz or a P-P voltage not more than 50 mV, i.e., a signal having a frequency not less than a threshold and an amplitude not more than a threshold, which is regarded as a non-target signal of the frequency division. Thus, the audible converter 122 converts only an ultrasonic signal having a P-P voltage more than 50 mV and a frequency more than 20 kHz and less than 50 kHz to an audio signal.

The threshold setting part 127 sets the thresholds of frequencies and amplitudes cut off by the audible converter 122. The threshold setting part 127 initially sets those thresholds at 50 kHz and 50 mV.

The reasons why the audible converter 122 performs frequency division on the ultrasonic signal to convert it to an audio signal are to remove unnecessary noises, and to lower the frequency so that the signal can be processed with inexpensive circuitry, thereby preventing the system from being complicated, as described above. However, the audible converter 122 is not an essential component, and may be omitted. To be precise, the signals processed by the audible converter 122 and subsequent components should be represented as "ultrasonic signals converted to audio signals"; however, for the sake of simplicity, they will be simply referred to as "ultrasound."

The A/D converter 123 converts ultrasound obtained by the frequency conversion of the audible converter 122 to a digital signal, and outputs it to an ultrasonic analyzer 131 in the determining unit 130.

The determining unit 130 includes an ultrasonic analyzer 131, an ultrasound determining part 132 and a notifying unit 136. The ultrasonic analyzer 131, which is an example of the acquiring unit, calculates the "burst width" and "intra-burst average-frequency difference" of ultrasound converted by the A/D converter 123 to a digital signal, as follows.

Figure 13A:
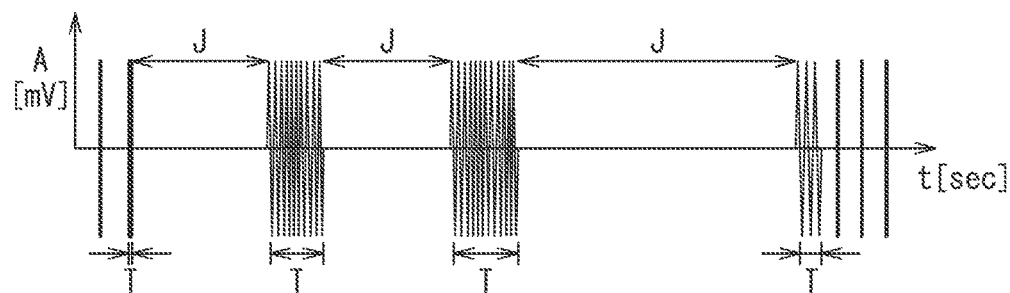
FIG. 13A is a waveform diagram for explaining a burst width of ultrasound.
Figure 13B:
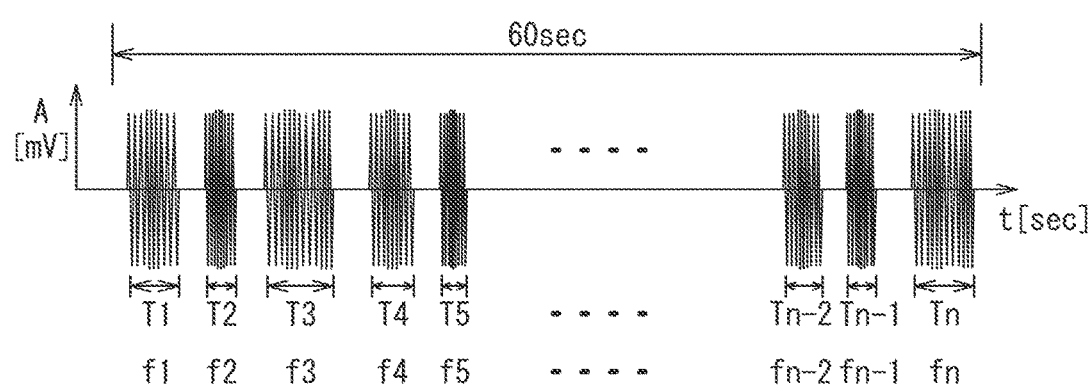
FIG. 13B is a waveform diagram showing an example of ultrasound generated in living space.

FIG. 13A is a waveform diagram for explaining a burst width of ultrasound, while FIG. 13B is a waveform diagram showing an example of ultrasound generated in living space. The abscissa t and ordinate A of each graph represent time and the amplitude level of ultrasound, respectively. As shown in FIG. 13A, the waveform of ultrasound is composed of clusters of pulses appearing intermittently. Thus, clusters of pulses appearing with intervals J of one second or more interposed therebetween are defined as "bursts," and the duration T of each burst is defined as its "burst width." FIG. 13B shows a waveform of ultrasound including n bursts whose burst widths and average frequencies are T1 to Tn and f1 to fn, respectively, in a period of 60 seconds. The difference between the maximum and minimum of the average frequencies f1 to fn of the bursts in this ultrasound is defined as its "intra-burst average-frequency difference."

The ultrasonic analyzer 131 calculates the burst widths T1 to Tn and the intra-burst average-frequency difference in a predetermined interval, and then calculates the ratio of the sum of the burst widths T1 to Tn to 60 seconds as a "total-burst-width ratio." The ultrasonic analyzer 131 outputs the calculated values of the intra-burst average-frequency difference and total-burst-width ratio to the ultrasound determining part 132. The burst widths, intra-burst average-frequency difference and total-burst-width ratio are examples of the burst information.

The ultrasound determining part 132 determines which of states, such as "presence detected," "abnormal state A" and "abnormal state B," the target of watching is in based on the total-burst-width ratio and intra-burst average-frequency difference acquired from the ultrasonic analyzer 131, and outputs the result of determination to the notifying unit 136.

For example, if a condition that "the total-burst-width ratio is less than 20% and the intra-burst average-frequency difference is not less than 20 kHz" holds more than once, the ultrasound determining part 132 regards the ultrasound as normal one generated in daily life of the watched person, and determines that the state is "presence detected." If a condition that "the total-burst-width ratio is not less than 20% and the intra-burst average-frequency difference is less than 20 kHz" holds more than once, the ultrasound determining part 132 regards the ultrasound as one generated by abnormal breathing of the watched person suffering from airway obstruction, and determines that the state is "abnormal state A." If a condition that "ultrasound whose total-burst-width ratio is not less than 90% is generated more than four times in a predetermined period" holds, the ultrasound determining part 132 regards the ultrasound as one generated by abnormal wriggling of the watched person, and determines that the state is "abnormal state B."

The values of the total-burst-width ratio and intra-burst average-frequency difference, such as 20%, 90% and 20 kHz, are prestored in the memory 180 of the watching system 101 as information on reference values used for the determination by the ultrasound determining part 132. These values are only an example; other values may be employed depending on the specifications of the watching system 101.

If "abnormal state A" or "abnormal state B" is inputted from the ultrasound determining part 132, the notifying unit 136 notifies it to the external terminal 140. Since "presence detected" is not an abnormal state, if "presence detected" is inputted, the notifying unit 136 does not notify it to the external terminal 140. However, if required from the external terminal 140, the notifying unit 136 may notify "presence detected" to the external terminal 140.

The sampling controller 150 in the notifying device 102 controls the sampling period of electric signals, while the timepiece 160 provides time information for the determining unit 130. The memory 180 stores information necessary for the operation of the watching system 101, such as the reference values used for the determination by the ultrasound determining part 132.

The external terminal 140 is placed in a control room or the like away from the watching system 101, watches over the state of the target person, and controls the functions of the watching system 101 as necessary. The watching system 101 and external terminal 140 are connected to each other through a communication channel TS.

Figure 14:
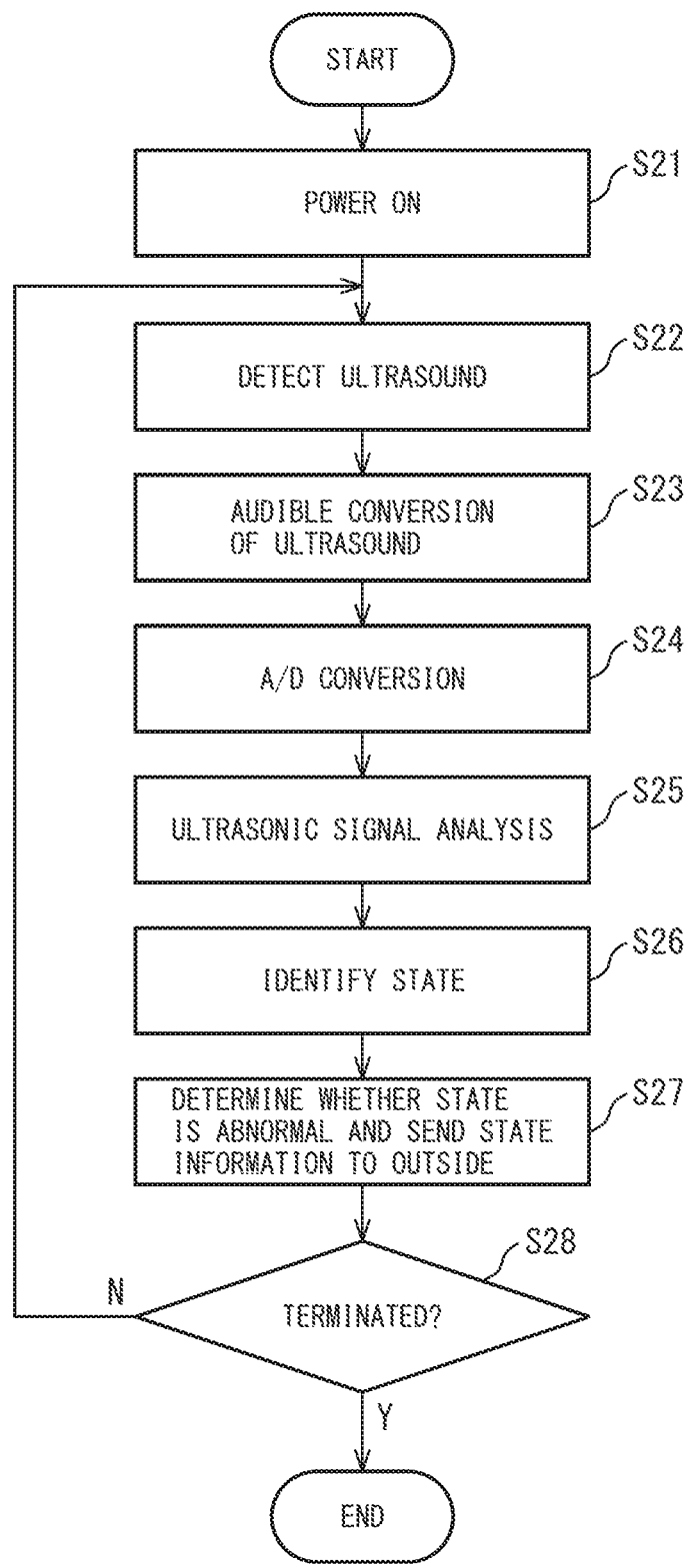
FIG. 14 is a flowchart showing an operational example of the watching system 101 and external terminal 140.

FIG. 14 is a flowchart showing an operational example of the watching system 101 and external terminal 140. A description will be given below of the flow shown in FIG. 14, by taking the operation of a case where the watched person reads a book in a room, and then goes out and returns a few minutes later, as an example. In this operational example, assume that bursts of ultrasound are generated in a period of 60 seconds during which the person reads a book; the sum of the burst widths is 5.4 seconds, while the maximum and minimum of the average frequencies of the bursts are 44.9 kHz and 21.5 kHz, respectively.

First, the external terminal 140 turns on the power of the watching system 101 (step S21). Then, the ultrasonic sensor 111 in the detector 110 detects ultrasound around the watched person, and outputs the ultrasonic signal to the signal processing unit 120 in the notifying device 102 (step S22). Next, the amplifier 121 and audible converter 122 in the signal processing unit 120 amplifies the ultrasonic signal inputted from the ultrasonic sensor 111, and converts the frequency thereof to a value in the audible range of the notifying device 102 (audible conversion), respectively (step S23). The A/D converter 123 performs digital conversion (A/D conversion) on the ultrasonic signal subjected to the audible conversion, and outputs it to the determining unit 130 (step S24).

The ultrasonic analyzer 131 in the determining unit 130 calculates the burst widths and average frequencies of bursts included in the A/D converted ultrasonic signal, calculates the total-burst-width ratio and intra-burst average-frequency difference from these values (ultrasonic signal analysis), and outputs the obtained values to the ultrasound determining part 132 (step S25). In this operational example, the ultrasonic analyzer 131 calculates the total-burst-width ratio and intra-burst average-frequency difference at 5.4/60×100=9 (%) and 44.9−21.5=23.4 (kHz), respectively.

The ultrasound determining part 132 identifies the state of the watched person, based on the total-burst-width ratio and intra-burst average-frequency difference acquired from the ultrasonic analyzer 131 (step S26). In this operational example, the ultrasound determining part 132 determines that the state is "presence detected," and outputs the result of determination to the notifying unit 136. Since information indicating "presence detected" is inputted from the ultrasound determining part 132, the notifying unit 136 determines that the state of the watched person is normal and stores this information. If information indicating an abnormal state is inputted from the ultrasound determining part 132, the notifying unit 136 sends this information to the external terminal 140 (step S27).

Thereafter, the external terminal 140 determines whether the watching operation of the watching system 101 is continued or terminated. If continued, the process returns to step S22; if terminated, the external terminal 140 stops the operation of the watching system 101 (step S28). In this way, the watching operation of the watching system 101 and external terminal 140 is performed.

Figure 15:
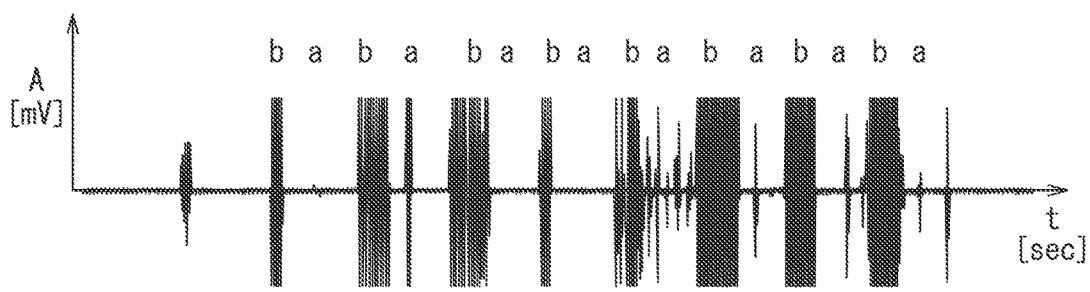
FIG. 15 is a waveform diagram for explaining a first example of detection performed by the watching system 101.

FIG. 15 is a waveform diagram for explaining a first example of detection performed by the watching system 101. FIG. 15 shows a waveform of ultrasound generated by abnormal breathing of a person. The abscissa t and ordinate A of FIG. 15 represent time and the amplitude level of ultrasound, respectively. Reference signs a and b indicate timing of breathing in and out, respectively. Normal breathing of a person hardly causes ultrasound, while a narrowed air passage resulting from an anomaly causes ultrasound.

Ultrasound generated by abnormal breathing of a person synchronizes with his/her breathing, as shown in FIG. 15.

This is because ultrasound is generated by air passing through the air passage in breathing. Ultrasound generated by abnormal breathing of a person has a burst-like waveform, as shown in FIG. 15, since pulse waves having frequencies in the range of 20 to 40 kHz appear at different times. Thus, detection of a burst-like waveform having a frequency in the range of 20 to 40 kHz leads to determination that there is some kind of anomaly in the breathing of the watched person.

Figure 16:
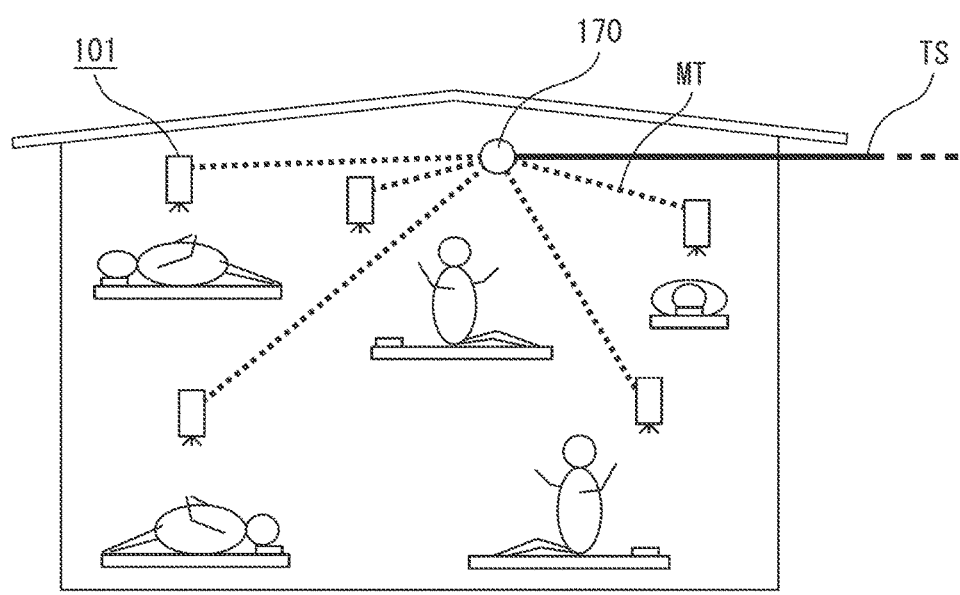
FIG. 16 is a schematic diagram for explaining a second example of detection performed by watching systems 101.

FIG. 16 is a schematic diagram for explaining a second example of detection performed by watching systems 101. FIG. 16 shows an example where a watching system targeted for many people is constructed with multiple watching systems 101 each of which is the same as the above-described one. In the illustrated example, the notifying devices 102 in the respective watching systems 101 are connected through radio communication MT to a common server 170, which is further connected through a communication channel TS to a common external terminal (not shown). The detectors 110 in the respective watching systems 101 each detect ultrasound generated in the close vicinity of the target person, and identify the person's state, such as "presence detected" or "abnormal breathing." Restricting the detection range of ultrasound of each watching system 101 in this way allows for watching over individuals living in a group.

Since the watching system 101 detects inaudible ultrasound generated by a watched person to find out his/her living state, voice (audible sound) information is not necessary. Since it does not acquire information related to privacy, such as details of his/her conversations, the watching system 101 can find out the living state, without unnecessarily worrying the watched person.

Unlike the embodiment shown in FIG. 11, the watching system 101 may be formed so as to be attached to a socket of a light bulb and supplied with electricity all the time. This can save the space for placing the watching system 101, and provides a power source for driving the watching system 101 at the same time. If it is attached to a socket of a light bulb, the watching system 101 may be provided with a light source so as to be also used as a luminaire.

The watching system need not detect all the states of the watched person, and may appropriately select the states to be detected according to the user's wishes. For example, the presence or absence may be detected for all of abnormal breathing, tumbling, walking and the like, or only for some of them.

Fifth Embodiment

Figure 17:
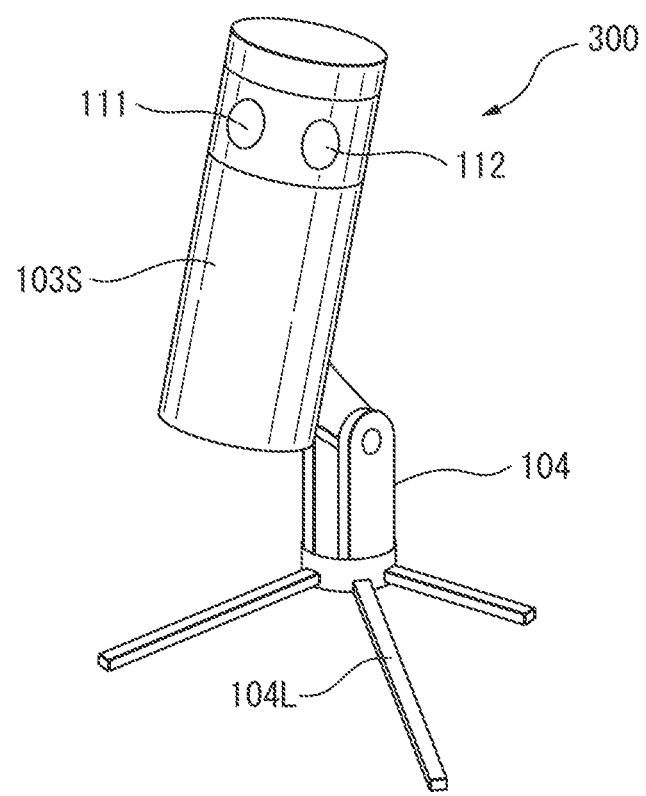
FIG. 17 is a diagram showing the appearance of a watching system 300.

FIG. 17 is a diagram showing the appearance of a watching system 300. The watching system 300 achieves the function of detecting ultrasound and infrasound in living space to watch over the state of a watched person. As shown in FIG. 17, the watching system 300 includes an ultrasonic sensor 111 and an infrasonic sensor 112 in a system body 103S, which is the same to the system body 103 of the watching system 101. Since the other features related to the appearance of watching system 300 are the same as those of the watching system 101, descriptions thereof will not be repeated.

Figure 18:
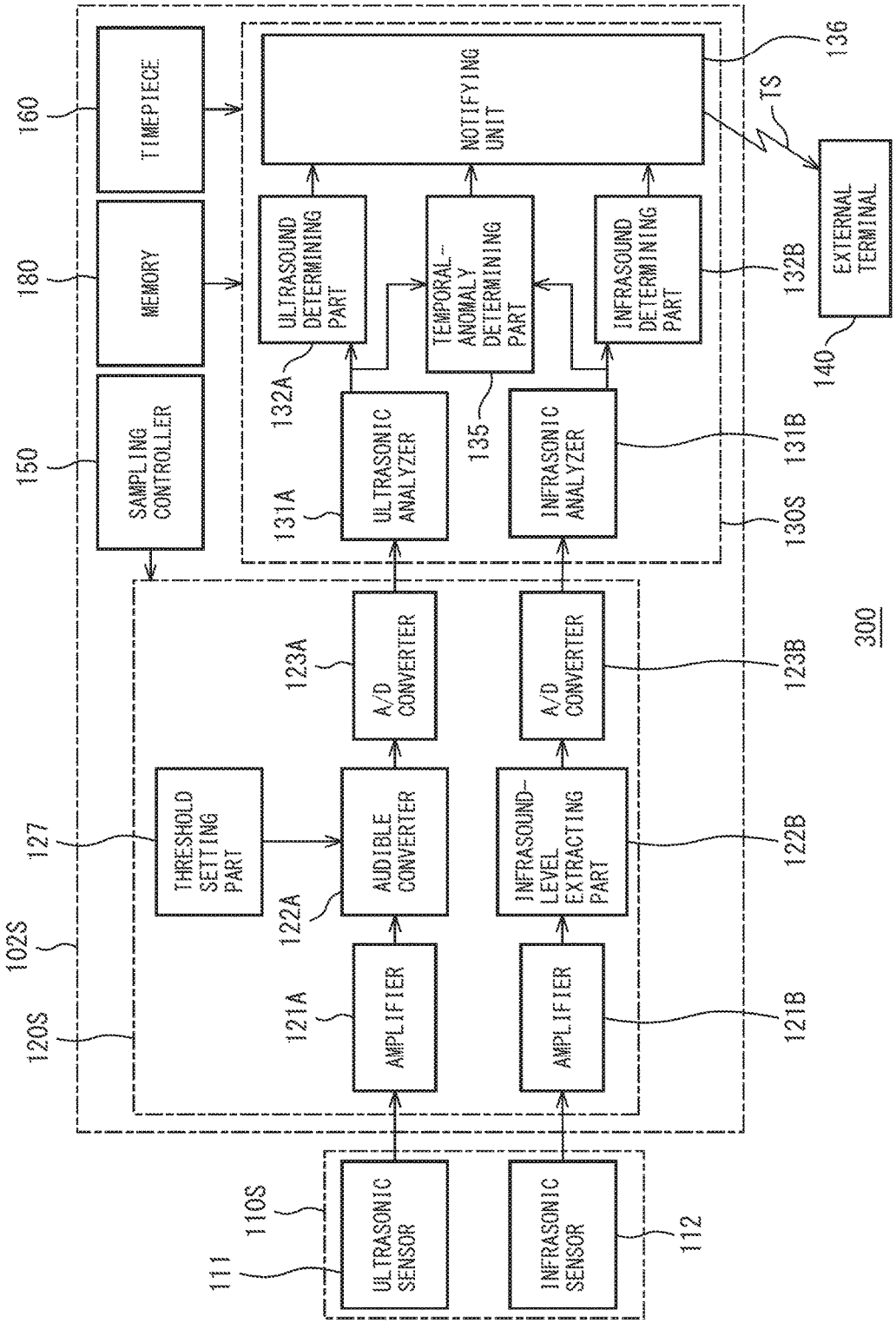
FIG. 18 is a block diagram of the watching system 300.

FIG. 18 is a block diagram of the watching system 300. As shown in FIG. 18, the watching system 300 includes a detector 110S and a notifying device 102S, the latter of which is connected to an external terminal 140 through a communication channel TS. The detector 110S includes the ultrasonic sensor 111 and infrasonic sensor 112. The notifying device 102S is constructed from a microcomputer including a CPU and a memory, and includes a signal processing unit 120S, a determining unit 130S, a sampling controller 150, a timepiece 160 and a memory 180. The signal processing unit 120S includes amplifiers 121A, 121B, an audible converter 122A, an infrasound-level extracting part 122B, A/D converters 123A, 123B and a threshold setting part 127. The determining unit 130 includes an ultrasonic analyzer 131A, an ultrasound determining part 132A, an infrasonic analyzer 131B, an infrasound determining part 132B, a temporal-anomaly determining part 135 and a notifying unit 136.

The watching system 300 is composed of an ultrasonic processor processing an ultrasonic signal detected by the ultrasonic sensor 111 in the detector 110S, and an infrasonic processor processing an infrasonic signal detected by the infrasonic sensor 112 in the detector 110S.

The ultrasonic processor of the watching system 300 is composed of the ultrasonic sensor 11; the amplifier 121A, audible converter 122A, A/D converter 123A and threshold setting part 127 in the signal processing unit 120S; and the ultrasonic analyzer 131A, ultrasound determining part 132A, temporal-anomaly determining part 135 and notifying unit 136 in the determining unit 130S. Since the ultrasonic processor of the watching system 300 is the same as that of the watching system 101, descriptions thereof will not be repeated.

The infrasonic processor of the watching system 300 is composed of the infrasonic sensor 112; the amplifier 121B, infrasound-level extracting part 122B and A/D converter 123B in the signal processing unit 120S; and the infrasonic analyzer 131B, infrasound determining part 132B, temporal-anomaly determining part 135 and notifying unit 136 in the determining unit 130S. The temporal-anomaly determining part 135 and notifying unit 136 are common components shared by the infrasonic and ultrasonic processors.

The infrasonic sensor 112 is constructed from a condenser microphone or acceleration sensor, for example, detects ambient infrasound having a frequency not less than 1 Hz and less than 20 Hz, converts it to an electric signal, and outputs it to the amplifier 121B in the signal processing unit 120S.

The amplifier 121B amplifies the infrasonic electric signal (infrasonic signal) inputted from the infrasonic sensor 112. The infrasound-level extracting part 122B extracts a frequency component centered at 10 Hz with a band-pass filter from the signal amplified by the amplifier 121B, performs absolute-value conversion and peak hold on the extracted signal, and outputs the resulting signal to the A/D converter 123B. The AD converter 123B converts the infrasonic signal acquired from the infrasound-level extracting part 122B to a digital signal, and outputs it to the determining unit 130S. To be precise, the signals processed by the A/D converter 123B and subsequent components should be represented as "infrasonic signals converted to digital signals"; however, for the sake of simplicity, they will be simply referred to as "infrasound."

The infrasonic analyzer 131B, which is an example of the acquiring unit, detects the pulse widths and interval of the infrasound inputted from the AD converter 123B, as follows.

FIG. 19 is a waveform diagram showing an example of an infrasonic signal generated in living space. FIG. 19 shows an example of the waveform of infrasound generated by opening or closing of a door, tumbling of a person, or the like. The abscissa t and ordinate A of FIG. 19 represent time and the sound pressure level of infrasound, respectively. The amplitude threshold TH is a reference value for determining the sound pressure level of the infrasound.

The infrasonic analyzer 131B detects rising edges U and falling edges D of infrasound pulses, and detects the duration during which the sound pressure level exceeds the amplitude threshold TH as a pulse width W of the infrasound, for each of two successive pulses. The infrasonic analyzer 131B also detects the interval K of the two successive pulses (duration from when the sound pressure level of the first pulse exceeds the amplitude threshold TH, to when that of the second pulse exceeds the amplitude threshold TH). Then, the infrasonic analyzer 131B outputs the values of the pulse widths W and interval K to the infrasound determining part 132B and temporal-anomaly determining part 135.

The infrasound determining part 132B determines the state of the watched person based on the infrasound pulse widths W and interval K inputted from the infrasonic analyzer 131B, as follows. For example, if the two successive infrasound pulse widths W are 5 seconds or less and their interval K is 60 seconds or less, the infrasound determining part 132B determines that the state is "door opening/closing detected." If infrasound whose sound pressure level exceeds the amplitude threshold TH is generated more than once in a predetermined time period (e.g., from 0 a.m. to 5 a.m.), the infrasound determining part 132B determines that the state is "single anomaly detected." and outputs the result to the notifying unit 136. The values of the amplitude threshold TH, pulse widths W and interval K, such as 5 seconds and 60 seconds, are prestored in the memory 180 of the watching system 300.

The infrasound determining part 132B may determine the state of the watched person based on only one of the pulse widths W and interval K of infrasound. For example, it may determine only whether the person tumbled, based on only the pulse widths W, or determine whether the person tumbled, or opened or closed a door, based on the sound pressure levels, pulse widths W and interval K.

The temporal-anomaly determining part 135 determines whether a door was opened or closed, based on the infrasound pulse widths W and interval K inputted from the infrasonic analyzer 131B, similarly to the infrasound determining part 132B. The temporal-anomaly determining part 135 also determines whether the person is in the room, based on the total-burst-width ratio and intra-burst average-frequency difference inputted from the ultrasonic analyzer 131A, similarly to the ultrasound determining part 132A. In addition, the temporal-anomaly determining part 135 performs the following temporal determination, based on the combination of temporal conditions and the results of determination as to whether a door was opened or closed and whether the person is in the room Temporal determination refers to determining which of states, such as "being present," "going out for travelling" and "anomaly," the watched person is in, according to temporal conditions and the results of determination of the presence or absence of the watched person and door opening/closing based on the ultrasound and infrasound analyses.

FIG. 20 is a table for explaining an example of the temporal determination of the watching system 300. As shown in FIG. 20, the temporal-anomaly determining part 135 determines, for example, that the state is "being present" if the presence of the watched person is detected within 24 hours regardless of the presence or absence of door opening/closing; "going out for travelling" if door opening/closing is detected within 24 hours of the previous determination of "presence detected" and the presence of the watched person has not been detected more than 24 hours since the previous door opening/closing; or "anomaly" if door opening/closing and the presence of the watched person have not been detected more than 24 hours since the previous determination of "presence detected." The temporal-anomaly determining part 135 outputs the result of determination to the notifying unit 136.

If "single anomaly detected" is inputted from the infrasound determining part 132B or "anomaly" is inputted from the temporal-anomaly determining part 135, the notifying unit 136 notifies it to the external terminal 140. Even if a result of determination other than "single anomaly detected" and "anomaly" is inputted, the notifying unit 136 may notify it to the external terminal 140.

Since the sampling controller 150, timepiece 160 and external terminal 140 of the watching system 300 are the same as those of the watching system 101, descriptions thereof will not be repeated. The memory 180 stores information on the reference values used for the determination by the ultrasound determining part 132A, infrasound determining part 132B and temporal-anomaly determining part 135.

Figure 21:
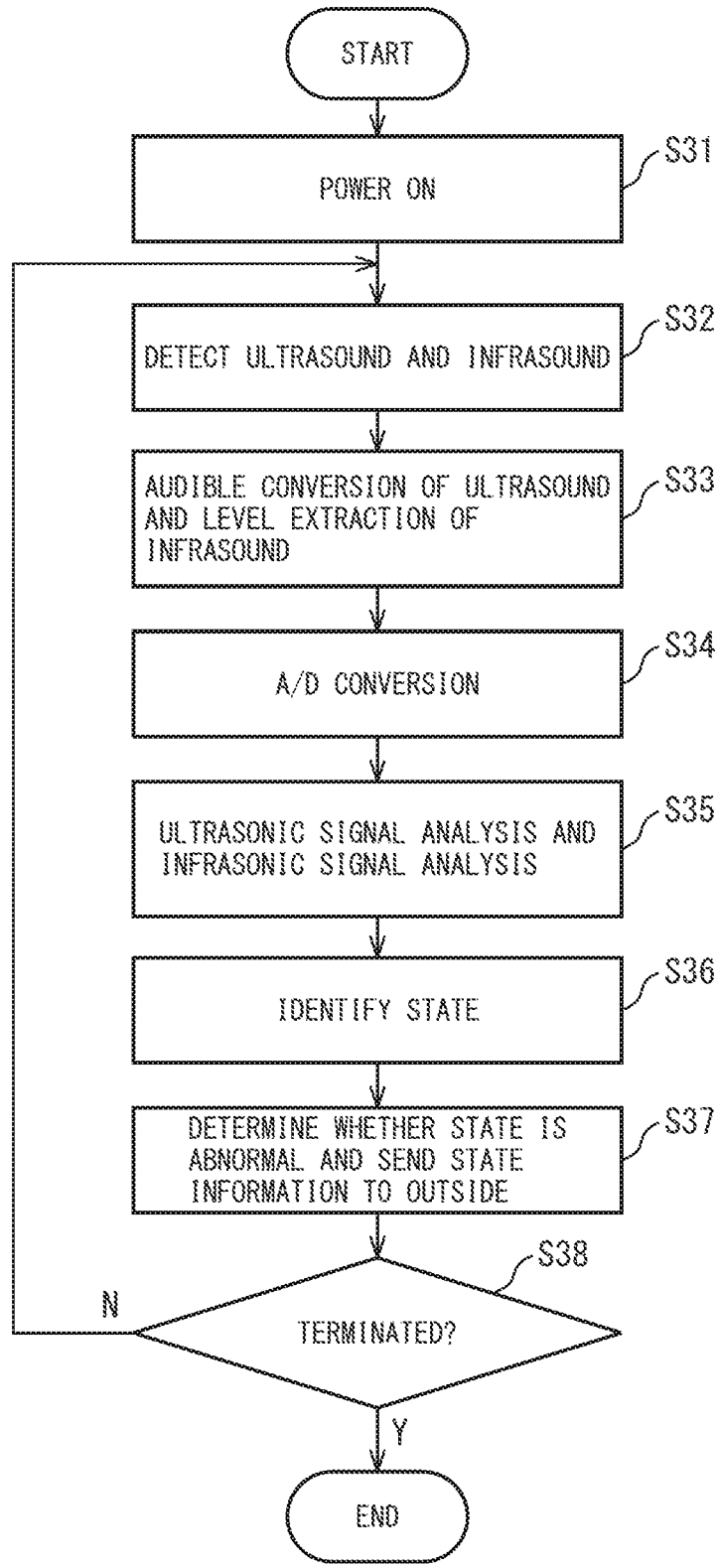
FIG. 21 is a flowchart showing an operational example of the watching system 300 and external terminal 140.

FIG. 21 is a flowchart showing an operational example of the watching system 300 and external terminal 140. A description will be given below of the flow shown in FIG. 21, by taking the operation of a case where the watched person reads a book in a room, and then goes out and returns a few minutes later, as an example. In this operational example, assume that bursts of ultrasound are generated in a period of 60 seconds during which the person reads a book; the sum of the burst widths is 5.4 seconds, while the maximum and minimum of the average frequencies of the bursts are 44.9 kHz and 21.5 kHz, respectively. Further, assume that the user's door opening and closing generate infrasound twice, whose waveforms have an interval K of 50 seconds and each have a pulse width W of 4 seconds.

First, the external terminal 140 turns on the power of the watching system 300 (step S31). Then, the ultrasonic sensor 111 and infrasonic sensor 112 in the detector 110S detect ultrasound and infrasound around the watched person, and output the ultrasonic and infrasonic signals to the signal processing unit 120S in the notifying device 102S (step S32). Next, the amplifier 121A and audible converter 122A in the signal processing unit 120S amplifies the ultrasonic signal inputted from the ultrasonic sensor 111, and converts the frequency thereof to a value in the audible range of the notifying device 102S (audible conversion), respectively. The amplifier 121B and infrasound-level extracting part 122B in the signal processing unit 120S amplifies the infrasonic signal inputted from the infrasonic sensor 112, and extracts the level thereof, respectively (step S33). The A/D converters 123A, 123B perform digital conversion (A/D conversion) on the ultrasonic and infrasonic signals respectively subjected to the audible conversion and level extraction, and output them to the determining unit 130S (step S34).

The ultrasonic analyzer 131A in the determining unit 130S calculates the burst widths and average frequencies of bursts included in the A/D converted ultrasonic signal, calculates the total-burst-width ratio and intra-burst average-frequency difference from these values (ultrasonic signal analysis), and outputs the obtained values to the ultrasound determining part 132A. In this operational example, the ultrasonic analyzer 131A calculates the total-burst-width ratio and intra-burst average-frequency difference of the ultrasonic signal at 5.4/60×100=9(%) and 44.9−21.5=23.4 (kHz), respectively. The infrasonic analyzer 131B detects the pulse widths, each 4 seconds, and the interval, 50 second, of the AD converted infrasonic signal (infrasonic signal analysis), and outputs the obtained values to the infrasound determining part 132B and temporal-anomaly determining part 135 (step S35).

The ultrasound determining part 132A and infrasound determining part 132B identify the state of the watched person, based on the total-burst-width ratio and intra-burst average-frequency difference acquired from the ultrasonic analyzer 131A, and based on the pulse widths and interval acquired from the infrasonic analyzer 131B, respectively (step S36). In this operational example, the ultrasound determining part 132A determines that the state is "presence detected," and outputs the result of determination to the notifying unit 136. The infrasound determining part 132B determines that the state is "door opening/closing detected," and outputs the result of determination to the notifying unit 136.

Since information indicating "presence detected" and "door opening/closing detected" is inputted from the ultrasound determining part 132A and infrasound determining part 132B, the notifying unit 136 determines that the state of the watched person is normal and stores this information. If information indicating an abnormal state is inputted from the ultrasound determining part 132A or infrasound determining part 132B, the notifying unit 136 sends this information to the external terminal 140 (step S37).

Thereafter, the external terminal 140 determines whether the watching operation of the watching system 300 is continued or terminated. If continued, the process returns to step S32; if terminated, the external terminal 140 stops the operation of the watching system 300 (step S38). In this way, the watching operation of the watching system 300 and external terminal 140 is performed.

Figure 22:
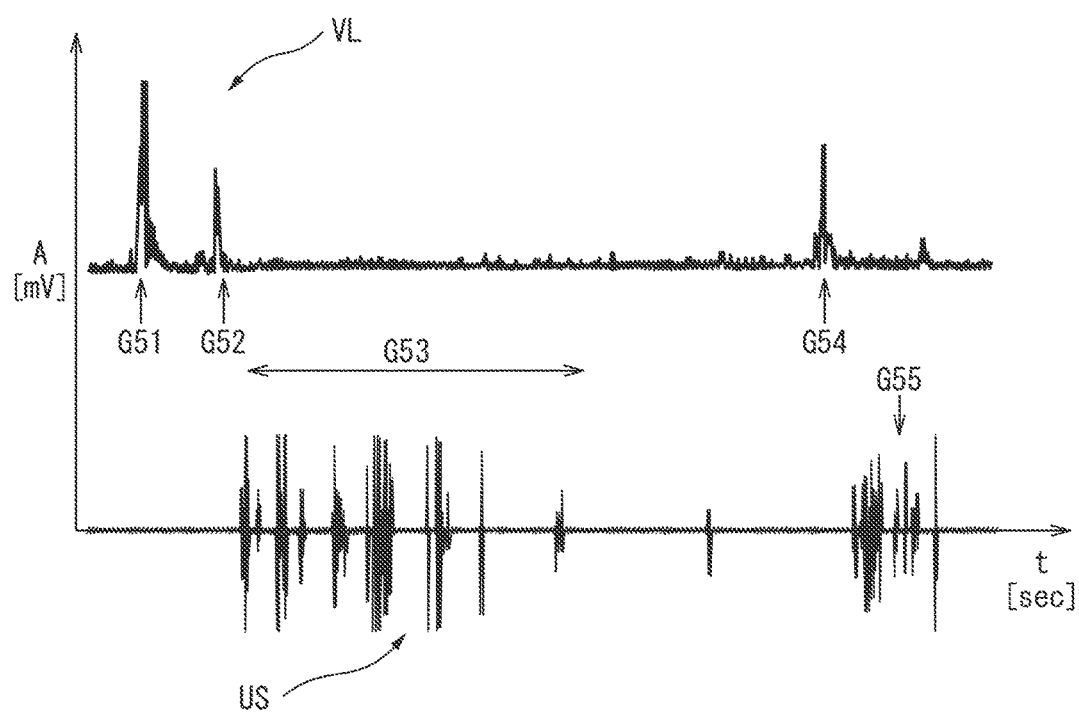
FIG. 22 is a waveform diagram for explaining an example of detection performed by the watching system 300.

FIG. 22 is a waveform diagram for explaining an example of detection performed by the watching system 300. FIG. 22 shows the waveforms of an ultrasound signal US and an infrasonic signal VL generated by a series of motions of a person including opening a door (G51), closing the door (G52), walking (G53), tumbling (G54) and wriggling (G55). These waveforms are based on actual measurements. The abscissa t of FIG. 22 represents time, while the ordinate A of FIG. 22 represents the amplitude level of the ultrasonic signal US and the sound pressure level of the infrasonic signal VL.

As shown in FIG. 22, door opening/closing (G51, G52) and tumbling of the person (G54) are correctly detected from the infrasonic signal VL, while his/her walking (G53) and wriggling (G55) which follows tumbling are correctly detected from the ultrasonic signal US. Thus, the use of both ultrasound and infrasound allows for surely detecting all the motions from the door opening/closing to the wriggling, which extremely increases the reliability of the watching system 300.

The watching system 101 detects ultrasound generated by motions of a watched person, while the watching system 300 detects ultrasound and infrasound generated by motions of a watched person; and they find out his/her state. However, only infrasound may be detected, if only motions generating infrasound, such as the presence or absence of door opening/closing and tumbling of the watched person, need to be detected.

Since the watching systems 101, 300 can find out the state of the watched person based on inaudible sound waves generated by his/her motions, they also have the effect of detecting the occurrence of an anomaly or a sudden illness in daily life. Accordingly, a reliable watching system aimed at a wide range of people including people living away from their families and single elderly people is provided. In particular, since the watching systems 101, 300 do not acquire audible information, such as conversations and voices of the watched person, they can find out his/her state without problems of privacy. Since inaudible sound waves generated by human beings and small animals, such as pets, have different frequency patterns from each other, errors due to motions of small animals other than human beings can be avoided by appropriately setting the reference values used for the determination.

The above-mentioned values of the thresholds, ranges and references for analyzing ultrasound and infrasound are only examples, and may be appropriately changed to other values depending on the specifications of the watching systems 101, 300. Further, the watching system may learn generation patterns, levels and the like of inaudible sound waves generated in a normal day of the watched person, and prestore information on reference values related thereto in the memory 180 of the watching system. In this case, if detection results obtained in operation are extremely apart from the prestored generation patterns and levels of inaudible sound waves, the watching system may determine that the watched person is in an abnormal state, and notify it to an external terminal.

The watching systems 101, 300 may be placed in a public toilet or the like, and sense ultrasound generated by rubbing of mechanical portions of a wheelchair or walking frame, thereby distinguishing entrances of a non-disabled person and a disabled person using a wheelchair or walking frame, to notify an abnormal state only when a disabled person, who may have an accident, comes in. In this way, a watching function may be realized according to the characteristics of people who enter the room.

The invention claimed is:
1. A detection device comprising:
a detector detecting inaudible sound waves generated by a bodily motion;
an acquiring unit acquiring burst information on at least one of the duration and frequency of a burst during which a cluster of pulses appears in a waveform of the inaudible sound waves detected by the detector;
a memory storing reference information on reference values compared with the burst information, the reference values differing from each other depending on the types of bodily motions generating inaudible sound waves; and
a determining unit comparing the burst information with the reference information to determine which of bodily motions has caused the inaudible sound waves detected by the detector,
wherein the acquiring unit acquires at least one of the values of the duration of the burst and the average frequency of the inaudible sound waves in the period of the burst, as the burst information.
2. The detection device according to claim 1, wherein the detector detects ultrasound having a frequency not less than 20 kHz and not more than 70 kHz, as the inaudible sound waves.
3. The detection device according to claim 2, wherein
the detector further detects infrasound having a frequency not less than 1 Hz and less than 20 Hz, as the inaudible sound waves,
the acquiring unit further acquires at least one of the duration of pulses included in the infrasound detected by the detector and an interval between the pulses, and the determining unit determines which of bodily motions has caused the inaudible sound waves, based on information on the duration or the interval.

4. The detection device according to claim 1, wherein the acquiring unit acquires the value of the duration of the burst, based on which of predetermined discrimination ranges the peak value of an integrated waveform obtained from a full-wave rectified waveform of the inaudible sound waves detected by the detector falls within.

5. The detection device according to claim 1, wherein the memory stores the burst information acquired by the acquiring unit from inaudible sound waves generated in advance by a user of the detection device, as the reference values.

6. The detection device according to claim 1, further comprising
an outputting unit outputting different pieces of operation information to an external appliance depending on a result of determination of the determining unit, the operation information being inputted to the external appliance for operating the external appliance.

7. A detection device comprising:
a detector detecting inaudible sound waves generated by a bodily motion;
an acquiring unit acquiring burst information on at least one of the duration and frequency of a burst during which a cluster of pulses appears in a waveform of the inaudible sound waves detected by the detector;
a memory storing reference information on reference values compared with the burst information, the reference values differing from each other depending on the types of bodily motions generating inaudible sound waves; and
a determining unit comparing the burst information with the reference information to determine which of bodily motions has caused the inaudible sound waves detected by the detector,
wherein the acquiring unit acquires at least one of the ratio of the duration of bursts appearing in a predetermined determination period to the determination period and the difference between the average frequencies of the bursts, as the burst information.

8. The detection device according to claim 7, wherein the detector detects ultrasound having a frequency not less than 20 kHz and not more than 70 kHz, as the inaudible sound waves.

9. The detection device according to claim 8, wherein
the detector further detects infrasound having a frequency not less than 1 Hz and less than 20 Hz, as inaudible sound waves,
the acquiring unit further acquires at least one of the duration of pulses included in the infrasound detected by the detector and an interval between the pulses, and
the determining unit determines which of bodily motions has cause the inaudible sound waves, based on information on the duration or the interval.

10. The detection device according to claim 7, further comprising a notifying unit notifying an external terminal of occurrence of a predetermined abnormal state, if a result of determination of the determining unit corresponds to the abnormal state.

* * * * *